United States Patent
Fischer

(10) Patent No.: US 9,603,089 B2
(45) Date of Patent: *Mar. 21, 2017

(54) RECTIFIER CIRCUIT MANAGEMENT SYSTEM, SUCH AS FOR USE IN CELL SITE POWER SYSTEMS

(71) Applicant: T-Mobile USA, Inc., Bellevue, WA (US)

(72) Inventor: Steve Fischer, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 86 days.

This patent is subject to a terminal disclaimer.

(21) Appl. No.: 14/628,138

(22) Filed: Feb. 20, 2015

(65) Prior Publication Data

US 2015/0163735 A1  Jun. 11, 2015

Related U.S. Application Data

(60) Continuation of application No. 13/855,667, filed on Apr. 2, 2013, now Pat. No. 8,983,546, which is a
(Continued)

(51) Int. Cl.
*H04W 24/00* (2009.01)
*H04W 52/00* (2009.01)
(Continued)

(52) U.S. Cl.
CPC ........ *H04W 52/0206* (2013.01); *H01Q 1/246* (2013.01); *H01Q 3/04* (2013.01);
(Continued)

(58) Field of Classification Search
None
See application file for complete search history.

(56) References Cited

U.S. PATENT DOCUMENTS 3,949,238 A  4/1976 Brookes et al.
4,451,773 A  5/1984 Papathomas et al.
(Continued)

FOREIGN PATENT DOCUMENTS

EP  1289091  3/2003
EP  1296464  10/2007
(Continued)

OTHER PUBLICATIONS

European Patent Office, Supplementary European Search Report, EP Patent Application 10803021.4 mailed Mar. 5, 2015, 10 pages.
(Continued)

*Primary Examiner* — Philip Sobutka
(74) *Attorney, Agent, or Firm* — Perkins Coie LLP

(57) ABSTRACT

Systems, apparatus, methods, and manufactures for conserving power in a communications system such as a communications service cell site or cell site. The methods include adjusting the RF coverage of the cell site antenna, selective control of the RF output transmit power, selective control of the communications bit rate, transfer of communications to other cell sites, adjustment of indicators such that mobile devices transfer communications to other cell sites, and reallocation of logical slots between radios in the cell site. In some examples, the cell site employs a power controller. The power controller may utilize a switching circuit to produce two different voltages from a single battery string during a commercial power failure with improved conversion efficiencies. In another example, a power controller may manage multiple rectifiers so that the rectifiers operate more efficiently, such as with approximately equal runtime and with regular testing.

20 Claims, 9 Drawing Sheets

Related U.S. Application Data division of application No. 12/726,279, filed on Mar. 17, 2010, now Pat. No. 8,412,272.

(60) Provisional application No. 61/228,467, filed on Jul. 24, 2009.

(51) Int. Cl.
| | |
|---|---|
| *H04W 88/08* | (2009.01) |
| *H04W 52/02* | (2009.01) |
| *H01Q 1/24* | (2006.01) |
| *H01Q 3/04* | (2006.01) |
| *H01Q 3/06* | (2006.01) |
| *H04W 24/04* | (2009.01) |
| *H04W 52/14* | (2009.01) |
| *H04W 52/44* | (2009.01) |
| *H04W 72/00* | (2009.01) |
| *H04W 92/20* | (2009.01) |

(52) U.S. Cl.
CPC .............. *H01Q 3/06* (2013.01); *H04W 52/00* (2013.01); *H04W 24/04* (2013.01); *H04W 52/0296* (2013.01); *H04W 52/143* (2013.01); *H04W 52/44* (2013.01); *H04W 72/00* (2013.01); *H04W 88/08* (2013.01); *H04W 92/20* (2013.01); *Y02B 60/50* (2013.01)

(56) References Cited

U.S. PATENT DOCUMENTS

| | | |
|---|---|---|
| 4,931,947 A | 6/1990 | Werth et al. |
| 5,099,694 A | 3/1992 | Sumio et al. |
| 5,185,684 A | 2/1993 | Beihoff et al. |
| 5,332,927 A | 7/1994 | Paul et al. |
| 5,532,525 A | 7/1996 | Kaiser et al. |
| 5,602,459 A | 2/1997 | Rogers |
| 5,646,462 A | 7/1997 | Cortes et al. |
| 5,661,463 A | 8/1997 | Letchak et al. |
| 5,705,929 A | 1/1998 | Caravello et al. |
| 5,844,327 A | 12/1998 | Batson |
| 5,886,503 A | 3/1999 | McAndrews et al. |
| 5,894,407 A | 4/1999 | Aakalu et al. |
| 5,920,129 A | 7/1999 | Smith et al. |
| 5,934,079 A | 8/1999 | Han et al. |
| 5,939,990 A | 8/1999 | Ahn |
| 6,137,261 A | 10/2000 | Kurle et al. |
| 6,169,390 B1 | 1/2001 | Jungreis |
| 6,184,593 B1 | 2/2001 | Jungreis |
| 6,188,591 B1 | 2/2001 | Ruter et al. |
| 6,223,037 B1 | 4/2001 | Parkkila |
| 6,281,602 B1 | 8/2001 | Got et al. |
| 6,304,059 B1 | 10/2001 | Chalasani et al. |
| 6,343,498 B1 | 2/2002 | Oba et al. |
| 6,463,295 B1 | 10/2002 | Yun |
| 6,469,471 B1 | 10/2002 | Anbuky et al. |
| 6,533,031 B1 | 3/2003 | Garcia et al. |
| 6,577,478 B2 | 6/2003 | Kim et al. |
| 6,583,603 B1 | 6/2003 | Baldwin |
| 6,614,671 B2 | 9/2003 | Thrap |
| 6,630,750 B2 | 10/2003 | McAndrews |
| 6,639,769 B2 | 10/2003 | Neiger et al. |
| 6,700,802 B2 | 3/2004 | Ulinski et al. |
| 6,751,205 B2 | 6/2004 | Menon et al. |
| 6,782,264 B2 | 8/2004 | Anderson |
| 6,889,752 B2 | 5/2005 | Stoller |
| 6,929,785 B2 | 8/2005 | Grieve et al. |
| 7,164,667 B2 | 1/2007 | Rayment et al. |
| 7,180,210 B1 | 2/2007 | Jorgenson et al. |
| 7,245,212 B2 | 7/2007 | Cope et al. |
| 7,366,120 B2 | 4/2008 | Handforth et al. |
| 7,466,225 B2 | 12/2008 | White, II et al. |
| 7,904,115 B2 | 3/2011 | Hageman et al. |
| 7,970,585 B2 | 6/2011 | Van Sloun et al. |
| 8,005,510 B2 | 8/2011 | Fischer |
| 8,279,074 B2 | 10/2012 | Fischer |
| 8,310,103 B2 | 11/2012 | Fischer |
| 8,412,272 B2 | 4/2013 | Fischer |
| 8,497,600 B2 | 7/2013 | Fischer |
| 8,729,732 B2 | 5/2014 | Fischer |
| 2001/0033502 A1 | 10/2001 | Blair et al. |
| 2004/0178770 A1 | 9/2004 | Gagnon et al. |
| 2004/0218567 A1 | 11/2004 | Budka et al. |
| 2005/0213527 A1 | 9/2005 | Xie |
| 2006/0182262 A1 | 8/2006 | Goldman et al. |
| 2006/0267411 A1 | 11/2006 | Farmer |
| 2006/0284489 A1 | 12/2006 | Gross et al. |
| 2007/0086132 A1 | 4/2007 | Ravera et al. |
| 2007/0119638 A1 | 5/2007 | Grieve |
| 2007/0200435 A1 | 8/2007 | Willets et al. |
| 2008/0013528 A1 | 1/2008 | Miller et al. |
| 2008/0042493 A1 | 2/2008 | Jacobs |
| 2008/0064361 A1 | 3/2008 | Bjork et al. |
| 2008/0303527 A1 | 12/2008 | Fechalos et al. |
| 2009/0267417 A1 | 10/2009 | Lee |
| 2013/0231156 A1 | 9/2013 | Fischer |
| 2014/0220957 A1 | 8/2014 | Fischer |

FOREIGN PATENT DOCUMENTS

| | | |
|---|---|---|
| GB | 2281458 A | 3/1995 |
| KR | 200380026 Y1 | 3/2005 |
| WO | WO-9734432 A1 | 9/1997 |
| WO | WO-0207464 A1 | 1/2002 |
| WO | WO-2005060287 | 6/2005 |
| WO | WO-2008030171 A2 | 3/2008 |
| WO | WO-2010006307 A1 | 1/2010 |
| WO | WO-2010006308 A1 | 1/2010 |
| WO | WO-2011011791 A2 | 1/2011 |
| WO | WO-2011115640 | 9/2011 |

OTHER PUBLICATIONS

International Search Report and Written Opinion for PCT/US2009/050313; Filed on Jul. 10, 2009, Applicant: T-Mobile USA, Inc.; Date of Mailing: Sep. 3, 2009, 14 pages.

International Search Report and Written Opinion for PCT/US2009/050315; Filed on Jul. 10, 2008; Applicant: T-Mobile USA, Inc.; Date of Mailing: Sep. 10, 2009, 12 pages.

"System Design," Hunter International, http://209.85.173.104/search?q=cache:w3UiSdhZ7gYJ:www.functional-telecom.com/page . . . , Aug. 22, 2008, 2 pages.

"Proton exchange membrane fuel cell," Wikipedia, http://en.wikipedia.org/wiki/Proton_exchange_membrane_fuel_cell, Feb. 25, 2009, 6 pages.

"Fuel Processing," IdaTech Advanced Fuel Cell Solutions, http://www.idatech.com/Fuel-Cell-Technology-Fuel-Processing.asp, Feb. 25, 2009, 1 page.

"Fuel Cells," IdaTech Advanced Fuel Cell Solutions, http://www.idatech.com/Fuel-Cell-Technology-Fuel-Cells.asp. Feb. 25, 2009, 1 page.

"Methanol," IdaTech Advanced Fuel Cell Solutions, http://www,idatech.com/Fuel-Cell-Technology-Methanol.asp, Feb. 25, 2009, 2 pages.

"iGen™ Fuel Cell Power Supply." IdaTech LLC., Copyright 2002-2007, 2 pages.

"ElectraGen™ XTi Integrated Fuel Cell System," IdaTech LLC., Copyright 2002-2007, 2 pages.

"Glossary," IdaTech Advance Fuel Cell Solutions, http://www.idatech.com/Fuel-Cell-Technology-Glossary.asp, Feb. 25, 2009, 2 pages.

"Battery Charging," IdaTech Advance Fuel Cell Solutions, http://www.idatech.com/Products-Services-Utilities.asp, Feb. 25, 2009, 1 page.

"Generator Start Control Module—MINI (2 Wire to 3 Wire)," Atkinson Electronics, Inc., Rev. Sep. 2005, 8 pages.

International Search Report for PCT/US2010/043267; Applicant: T-Mobile USA, Inc. et al., Date of Mailing Apr. 5, 2011; 9 pages.

(56) References Cited

OTHER PUBLICATIONS

International Search Report and Written Opinion for PCT/US2010/043283; Filed on Jul. 26, 2010; Applicant: T-Mobile USA, Inc.: Date of Mailing Apr. 15, 2011; 8 pages.
European Patent Office, Supplementary European Search Report, EP Patent Application 09795264.2, dated Aug. 14, 2012, 10 pages.
European Patent Office, Extended European Search Report, EP Patent Application 10848118.5, mailed Apr. 4, 2014, 9 pages.
3rd Generation Partnership Project; Technical Specification Group GSM/EDGE Radio Access Network; Radio subsystem link control (Release 7); 3GPP TS 45.008. Feb. 2008, 117 pages.
European Patent Office, Extended European Search Report, EP Patent Application 09795263.4, mailed May 27, 2014, 4 pages.
European Patent Office, Supplementary Partial European Search Report, EP Patent Application 10803021.4, mailed Dec. 4, 2014, 5 pages.

RECTIFIER CIRCUIT MANAGEMENT SYSTEM, SUCH AS FOR USE IN CELL SITE POWER SYSTEMS

CROSS-REFERENCE TO RELATED APPLICATIONS

The present application is a continuation of U.S. patent application Ser. No. 13/855,667, filed Apr. 2, 2013, now U.S. Pat. No. 8,983,546, entitled "RECTIFIER CIRCUIT MANAGEMENT SYSTEM, SUCH AS FOR USE IN CELL SITE POWER SYSTEMS", which is a division of U.S. patent application Ser. No. 12/726,279, filed Mar. 17, 2010, now U.S. Pat. No. 8,412,272, entitled "RECTIFIER CIRCUIT MANAGEMENT SYSTEM, SUCH AS FOR USE IN CELL SITE POWER SYSTEMS", which claims priority to U.S. Provisional Patent Application No. 61/228,467 entitled "CELL SITE IMPROVEMENTS," filed on Jul. 24, 2009, which is hereby incorporated by reference herein.

BACKGROUND

The popularity of commercial wireless communications services (e.g., wireless telephony, wireless network access, and wireless email) has substantially increased during recent years. In many cases, users, such as consumers, mobile workers, emergency response personnel, and/or the like, now utilize these services for both personal and business communications. Likewise, users are increasingly relying on these services. For example, some households forgo wired telephone service in favor of wireless telephone service; some government agencies rely on these services for both routine and emergency communications; and businesses rely on these services to communicate with customers and mobile workers. Correspondingly, the cost (both financial and nonfinancial) of outages is also increasing.

Typical commercial wireless communications service ("CMRS") providers rely on remote facilities to provide services. For instance, CMRS providers rely on cell sites (e.g., base stations, radio repeaters, wireless to back-haul interfaces, etc.) to facilitate some communications services. If a cell site experiences a loss of commercially provided electrical power, users near the cell site may experience a service outage. Power outages are an example of a common cause for cell site failures. For example, natural disasters, rolling brownouts, accidents, and/or the like may result in power outages. While most cell sites include some form of backup power (e.g., generators and/or batteries), these forms of backup power may not provide sufficient power during lengthy power outages and may require servicing, monitoring, and on-site maintenance. During lengthy power outages, the use of commercial wireless communications services may increase due to users' needs and/or desires. Further, pending regulations may require commercial wireless communications service providers to provide cell sites with at least seven days of back-up power.

DETAILED DESCRIPTION

Figure 1:
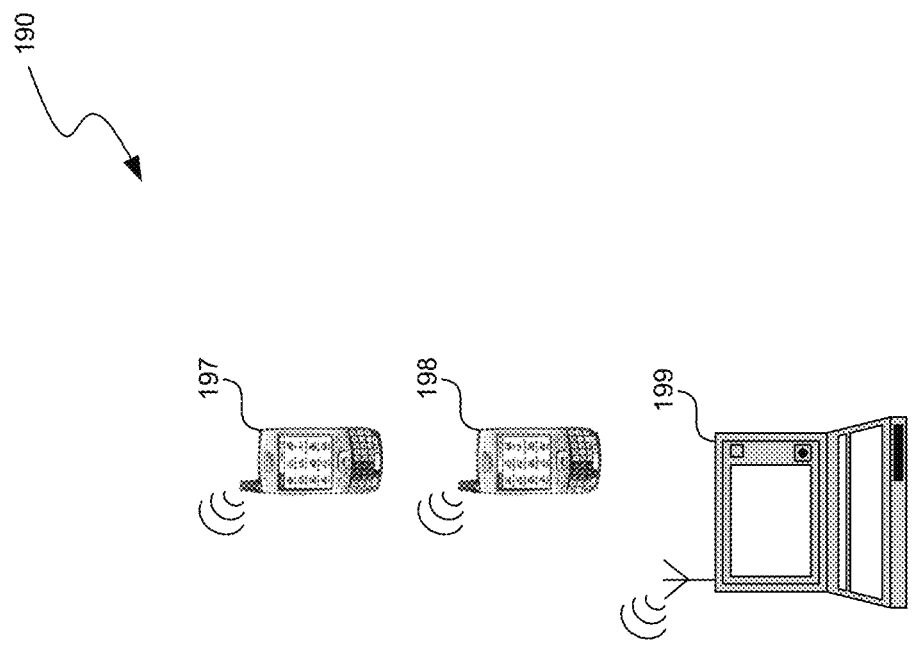
FIG. 1 is a block diagram of an environment for practicing the invention.
Figure 1:
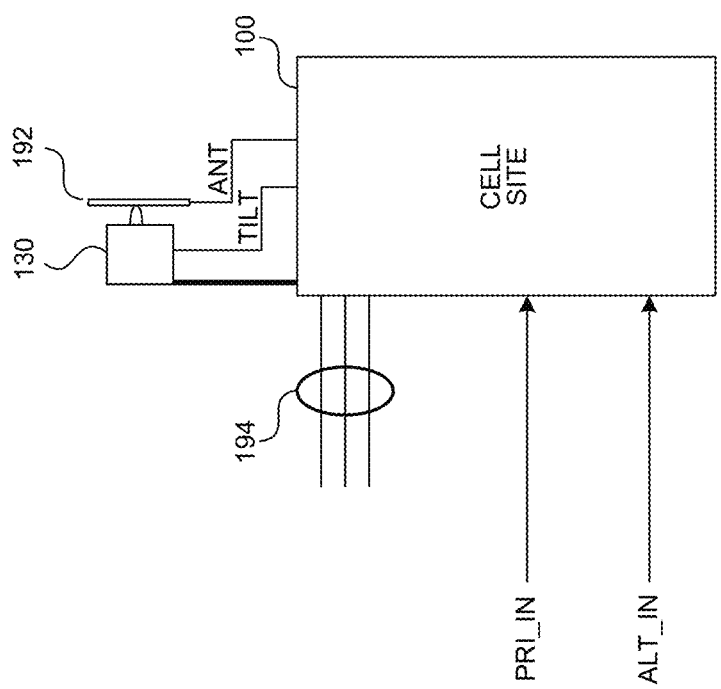

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. The terminology used in the below description should be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

As one non-limiting example, the technology may be employed for conserving power in a communications system such as a wireless communications service cell site. For example, the technology may be employed to conserve power during a power source's periods of reduced availability. A cell site's run time from backup power may be increased by employing the various power conservation features described below. For example, the cell site may decrease the backup battery circuit discharge rate, the backup generator fuel consumption rate, and/or the like.

As another non-limiting example, a cell site may include a power controller that utilizes a switching circuit (e.g., an H-bridge) to produce two different voltages from a single battery string during a commercial power failure with improved conversion efficiencies. The dual voltages produced may permit a cell site to utilize legacy and next-generation wireless protocols during a power failure.

As another non-limiting example, a cell site power controller may provide management of multiple rectifiers. The power controller may rotate the rectifiers in and out of active operation so that the rectifiers operate closer to capacity and, thus, more efficiently. Rectifier rotation also ensures that the runtime of the various rectifiers is approximately equal and provides a way of testing the rectifiers for failures.

The below described power conservation features may also decrease both capital and operating costs for providing backup power to a cell site. For example, pending Federal Communications Commissions ("FCC") regulations may require commercial wireless communications service providers to provide cell sites with at least seven days of backup power. Likewise, Environmental Protection Agency ("EPA"), state, and local regulations may regulate storage of large amounts of backup generator fuel. In addition, the cost, size, and weight of backup batteries may limit the number of batteries that can be practically located at a cell site. For these and other reasons, the power conservation features described below may be employed to increase the backup power runtime for cell sites.

Suitable System

FIG. 1 is a block diagram of an environment 190 in which the invention may be practiced. As shown, the environment 190 includes a cell site 100 configured to wirelessly communicate with wireless devices 197-199. The cell site 100 includes an antenna 192, and a remote tilt mechanism 130. The cell site 100 is coupled to a back-haul 194 and configured to receive power via a primary power signal PRI_IN and an alternate power signal ALT_IN.

The cell site 100 may include virtually any device for facilitating wireless network access. For example, the cell site 100 may be a wireless telephony base station, a wireless network access base station, a wireless email base station, and/or the like. In one embodiment, the cell site 100 is operated by a mobile telephony service provider or CMRS. Generally, the cell site 100 is configured to provide a network interface for wireless devices 197-199 by providing an interface (via the antenna 192) between wireless devices 197-199 and the back-haul 194. The cell site 100 and wireless devices 197-199 may communicate using any wireless protocol or standard. These include, for example, Global System for Mobile Communications ("GSM"), Time Division Multiple Access ("TDMA"), Code Division Multiple Access ("CDMA"), Orthogonal Frequency Division Multiple Access ("OFDM"), General Packet Radio Service ("GPRS"), Enhanced Data GSM Environment ("EDGE"), Advanced Mobile Phone System ("AMPS"), Worldwide Interoperability for Microwave Access ("WiMAX"), Universal Mobile Telecommunications System ("UMTS"), Evolution-Data Optimized ("EVDO"), Long-Term Evolution ("LTE"), Ultra Mobile Broadband ("UMB"), and the like.

The back-haul 194 may be any connection that provides a network interface for the cell site 100. For example, the back-haul 194 may include one or more T-1 connections, T-3 connections, OC-3 connections, frame relay connections, Asynchronous Transfer Mode (ATM) connections, microwave connections, Ethernet connections, and/or the like. In addition, the back-haul 194 may provide an interface to a telephone switch (e.g., to a 9ESS switch or a Private Branch Exchange switch), to a data network (e.g., to a router or network switch), and the like.

The cell site 100 may also be configured to receive power via the primary power signal PRI_IN, for example, as alternating current ("AC") power from a public utility, a power grid, photovoltaic power sources (e.g., solar panels or arrays), a turbine, a fuel cell, a generator, and/or the like. However, the primary power signal PRI_IN may be provided by virtually any power source and as either AC and/or direct current ("DC") power.

Further, the cell site 100 may also be configured to receive power via alternate power signal ALT_IN, for example, from an alternate energy power source. Alternative energy sources may include photovoltaic power sources, wind power sources, geothermal power sources, generators, fuel cells, bioreactors, and/or the like. In typical environments, DC power is received by the cell site 100 via alternate power signal ALT_IN. However, either AC and/or DC power may be received via alternate power signal ALT_IN.

At times, however, primary power signal PRI_IN and/or alternate power signal ALT_IN may provide insufficient power to operate the cell site 100 (e.g., during a commercial power outage). Accordingly, the cell site 100 may also include a battery circuit, as discussed below. While the cell site 100 may include backup power sources, it may be beneficial to conserve power at the cell site 100 during such reduced availability periods. Such power conservation may increase the backup power runtime of the cell site 100.

The remote tilt mechanism 130 may be included to control a tilt angle of the antenna 192. The tilt angle of the antenna 192 may, for example, define a radio frequency ("RF") coverage (e.g., coverage area, footprint, pattern, etc.) of the cell site 100. The remote tilt mechanism 130 may include an electronically controlled actuator such as a solenoid, motor, and/or the like and may be configured to tilt the antenna 192 based, at least in part, on a tilt signal TILT.

The antenna 192 may be included to facilitate communications between mobile devices 197-199 and the cell site 100 and is coupled to the cell site 100 via antenna signal ANT. Antenna 192 may be any type of suitable antenna. One example of a suitable antenna includes a directional flat panel antenna having fixed gain and fixed azimuth angle. However, other types of antennas may also be suitably employed. For example, omnidirectional antennas, lossy transmission lines, beam steerable antennas, variable gain antennas, and/or the like may be employed as appropriate. The antenna 192 may also include a preamplifier (not shown) to preamplify received signals. The cell site 100 may be coupled to any number of antennas. For example, a typical cell site may provide coverage to three sectors of approximately 120° each. One or more antennas may provide coverage to each sector. However, in other systems, any other number of antennas and/or sectors may be employed. Also, the antenna 192 may be either a tiltable or a non-tiltable antenna.

The remote tilt mechanism 130 may be omitted in some environments. For example, the remote tilt mechanism 130 may be omitted if the antenna 192 is an omnidirectional antenna, a beam steerable antenna, and/or the like.

Wireless devices 197-199 may include virtually any devices for communicating over a wireless network. For example, wireless devices 197-199 may include mobile telephones (e.g., cellular telephones, GSM telephones, TDMA telephones, LTE telephones, etc.), wireless data devices (e.g., Personal Digital Assistants (PDAs), computers, pagers, etc.), and/or the like.

Table 1, below, introduces various power conservation features that may be employed in the cell site 100 and/or in the environment 190 to selectively conserve power. These power conservation features are described in greater detail below.

TABLE 1 power conservation features.

| | |
|---|---|
| 1 | selective adjustment of the RF coverage of the antenna 192 |
| 2 | selective control of an RF output transmit power level |
| 3 | selective control of a communications bit rate |
| 4 | transfer of communications to other cell sites |
| 5 | adjustment of indicators such that associated mobile devices transfer communications to other cell sites |
| 6 | reallocation of communications between radios and logical slots of the cell site 100 |
| 7 | utilization of a switching circuit to produce dual output voltages from a single battery string |
| 8 | management of multiple rectifiers to improve efficiency and rectifier testing |

In addition, the various power conservation features of Table 1 may also be employed in conjunction with the fuel conservation and other technologies described in the assignee's U.S. patent application Ser. No. 12/170,675, entitled "CELL SITE POWER GENERATION," filed on Jul. 10, 6008, which is hereby incorporated by reference.

These other power conservation features may be selectively enabled based, at least in part, on power source availability. The various power conservation features may also be selectively enabled based, at least in part, on other environmental parameters. For example, environmental parameters may include the amount of RF interference, the distance between the cell site 100 and wireless devices 197-199, topography, geography, and/or the like.

As one example, the RF interference may be quantified through a carrier to interference ratio ("C/I"). However, in other examples, a signal to noise ratio ("SNR"), a bit error rate ("BER"), a frame error rate ("FER"), and/or the like may also be suitably employed. In addition, resource management (e.g., base station traffic load, system traffic load, etc.) and aggregate call quality may be factors to determine which, if any, power conservation features are employed with each particular wireless device or communications channel. For example, while the cell site 100 communicates with a wireless device over a favorable C/I channel (e.g., greater than 20 dB), more power conservation features may be employed. However, if the channel between the cell site 100 and another wireless device has a less favorable C/I (e.g., less than 9 dB), fewer power conservation features may be employed. In this way, the cell site 100 may balance power consumption and call quality considerations. Also, the various power conservation features may be individually or collectively employed in any number of combinations. For example, multiple or all of the power conservation features of Table 1 may be simultaneously employed during certain conditions such as during an extended power outage, when backup power is low, when call volume is high, and/or the like.

The cell site 100 may be configured to selectively tilt the antenna 192 to selectively define, in part, its RF coverage. For example, changing the RF coverage of the antenna 192 may affect power consumption by increasing or decreasing the number of wireless devices associated with the cell site 100. Selective tilting of the antenna 192 is discussed in further detail with respect to FIG. 2.

The cell site 100 may be further configured to selectively control its RF output transmit power. For example, the cell site 100 may selectively decrease its RF output transmit power as a power conservation feature or increase its RF output transmit power to increase its RF coverage. This selective control may include changing the RF output transmit power by any suitable amount. As one example, the cell site 100 may be configured to increase or decrease its RF output transmit power in 2 decibel ("dB") steps.

Additionally, the cell site 100 may be configured to selectively control a communications bit rate for voice traffic. For example, the cell site 100 may decrease its voice traffic communications bit rate while operating from backup power and increase its bit rate while operating from a commercial power source. By lowering the communications bit rate, the cell site 100 may process a given amount of voice traffic while employing fewer radios and/or logical slots. Unused radios and/or logical slots may be disabled to conserve power.

As one example, a suitable bit rate may be configured by selecting between codecs such as a full-rate codec, an enhanced full-rate codec, a half-rate codec, various modes of an adaptive multi-rate codec, and/or the like. Selection between these codecs may affect both the compression for the voice traffic and the bit-rate of additional information that is transmitted with the compressed voice traffic. This additional information may include padding, forward error correction coding, other error coding, and/or the like. In addition, discontinuous transmission ("DTX") thresholds and/or the like may also be adjusted based, at least in part, on the power source availability status. Adjustment of DTX thresholds may further affect the communications bit rate.

In addition, the communications bit rate may also be selectively controlled based, at least in part, on environmental parameters. For example, a codec and/or bit rate may be selected based, at least in part, on the C/I of a particular logical slot. This codec and/or bit-rate may then be adjusted based, at least in part, on the power source availability status. For example, during a commercial power source outage, a bit-rate that is one or two steps lower than would otherwise be employed for the given C/I level may be employed as a power conservation feature.

The cell site 100 may also be configured to transfer voice and/or data traffic from wireless devices 197-199 to another cell site. For example, the cell site 100 may employ directed retries, forced handoffs, and/or the like. By decreasing communications, the cell site 100 may decrease the number of radios in operation, the number of active logical slots, the amount of voice traffic, and/or the like. In turn, this may reduce power consumption at the cell site 100.

Likewise, the cell site 100 may be configured to adjust indicators such that wireless devices transfer communications to other cell sites, such as adjacent and/or neighboring cell sites. As one example, the cell site 100 provides indicators to wireless devices 197-199 to indicate an estimated or calculated service level for communications with both the cell site 100 and other cell sites. These indicators may represent a signal level (e.g., RSSI, C/I, BER, FER, etc.) received from wireless devices 197-199 at each cell site within a geographical area. These indicators may also be based, at least in part, on a cell 1 reselect ("C1") value or a cell 2 reselect ("C2") value from a base station controller such as a base station controller 350 shown in FIG. 3.

Wireless devices 197-199 may then employ these indicators to request association with a particular cell site. The cell site 100 and/or an associated component (e.g., a system controller 320, an OMC 330, a switch 340, a base station controller 350, or an RNC 360 of FIG. 3) may adjust these indicators to offset the indicated levels from the estimated or calculated values. For example, the cell site 100 and/or the associated component may adjust the C1 or C2 values and/or a receiver access minimum value such that wireless devices 197-199 may be induced to prefer and/or transfer association with, or to, an adjacent or neighboring cell site operating from a commercial power source.

In addition, the cell site 100 may reallocate communications between radios and logical slots of the cell site 100 based, at least in part, on the commercial power source outage status. For example, the cell site 100 may employ different radios and/or logical slots to facilitate communications between the cell site 100 and wireless devices 197-199. Reallocation of logical slots is discussed in further detail with respect to FIG. 4.

In addition, the cell site 100 may comprise a power controller (e.g., 610 in FIG. 6) that utilizes a switching circuit (e.g., a doubling switching circuit, an H-bridge, etc.) to produce two different voltages from a single battery string during a commercial power failure with improved conversion efficiencies. The dual voltages may permit the cell site 100 to utilize both legacy and next-generation wireless protocols even during a power failure. The utilization of a doubling switching circuit is discussed in further detail with respect to FIG. 6.

In addition, the cell site 100 may comprise a power controller that provides management of multiple rectifiers. The power controller rotates the rectifiers in and out of active operation so that the rectifiers operate closer to capacity and thus, more efficiently. The rotation also ensures that the runtime of the various rectifiers is approximately equal and provides a way of testing the rectifiers for failures. The management of multiple rectifiers is discussed in further detail with respect to FIGS. 6-9.

As one example, the cell site 100 draws approximately 39 amperes of current (at approximately −56 volts) while operating at full power. By enabling a half-rate codec instead of a full-rate codec, the current draw decreases to approximately 31 amperes. By additionally decreasing the transmitter output power by 2 dB, the current draw decreases to approximately 27 amperes. By additionally decreasing the transmitter output power by another 2 dB, the current draw decreases to approximately 24 amperes. In this example, a commercial wireless communications service provider may prefer the 27 ampere consumption level as a balance between power consumption and system performance.

One skilled in the art will appreciate that although illustrated in the context of a wireless telecommunications environment, the invention may be practiced in any environment in which backup power serves a commercial, public, or private operation or system reliant upon electrical power.

Figure 2:
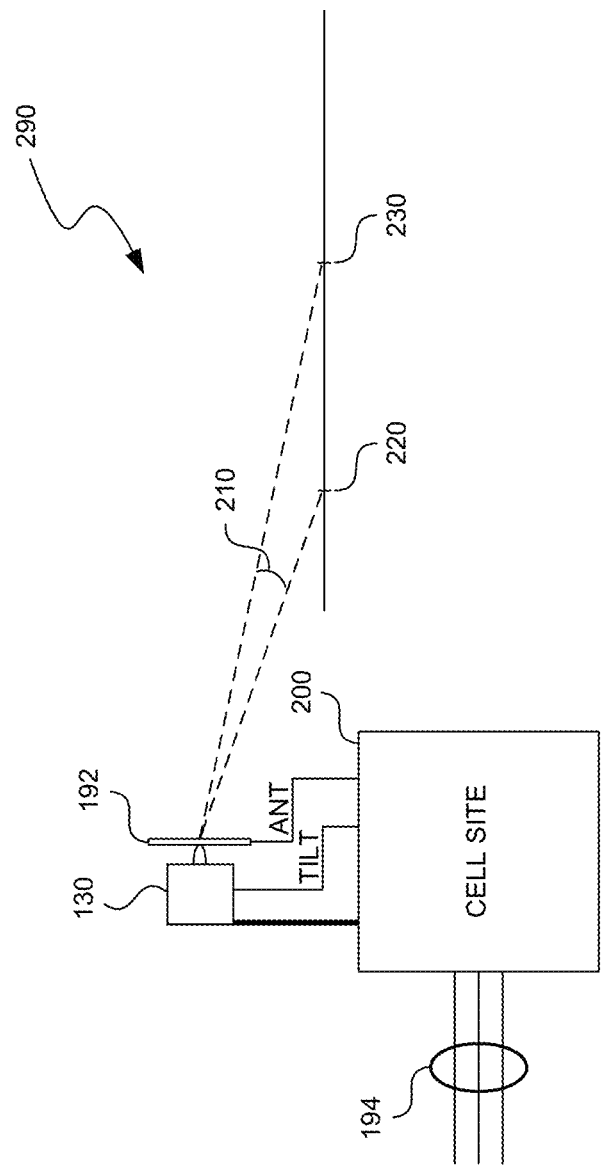
FIG. 2 is a diagram of another suitable environment for practicing the invention.

FIG. 2 is a diagram of an environment 290 in which power conservation features may be practiced. As shown, the environment 290 includes a cell site 200, a remote tilt mechanism 130, and an antenna 192. FIG. 2 illustrates the relationship between an elevation difference angle 210, a location 220, and a location 230. FIG. 2 is not drawn to scale.

As discussed above, the cell site 200 may be configured to selectively tilt the antenna 192 to define, in part, its RF coverage. As shown in FIG. 2, the tilt angle of the antenna 192 defines, in part, the communications range of the cell site 200. For example, if set at a first angle while the cell site 200 provides a constant RF output transmit power, the communications range may reach the location 220. However, if the antenna 192 is up-tilted by the elevation difference angle 210, the communications range may be extended to the location 230 for the same RF output transmit power. While the C/I for communications with the cell site 200 may decrease, up-tilting the antenna 192 may be employed with corresponding RF output transmit power decreases to maintain a coverage area while conserving power. Tilting of the antenna 192 may be accomplished either by mechanically tilting the antenna 192 or by beam steering the elevation angle of the antenna 192.

As one example of a communication system, the antenna 192 may be up-tilted by approximately 4° during normal operation. During a commercial power source outage, the antenna 192 may be up-tilted by an elevation difference angle 210 of approximately 2° (to approximately 6°) while the RF output transmit power is reduced by 2 dB. In addition, during an extended commercial power source outage, the antenna 192 may be up-tilted by two times the elevation difference angle 210 (to approximately 8°) while the RF output transmit power is reduced by an additional 2 dB. However, any other suitable elevation difference angles and/or RF output transmit power reductions may be employed.

However, the elevation difference angles discussed herein are merely provided as an example of elevation difference angles in one system. Such elevation difference angles may depend on a vertical beam width, an azimuth angle, environmental conditions, and/or the like for a particular system and/or antenna. Other elevation difference angles may be employed to provide and/or maintain coverage in a geographical area. Likewise, elevation difference angles may be selected to adjust a handoff point at which a wireless device may handoff from the cell site 200 to an adjacent or neighboring cell site.

Illustrative Communications System

Figure 3:
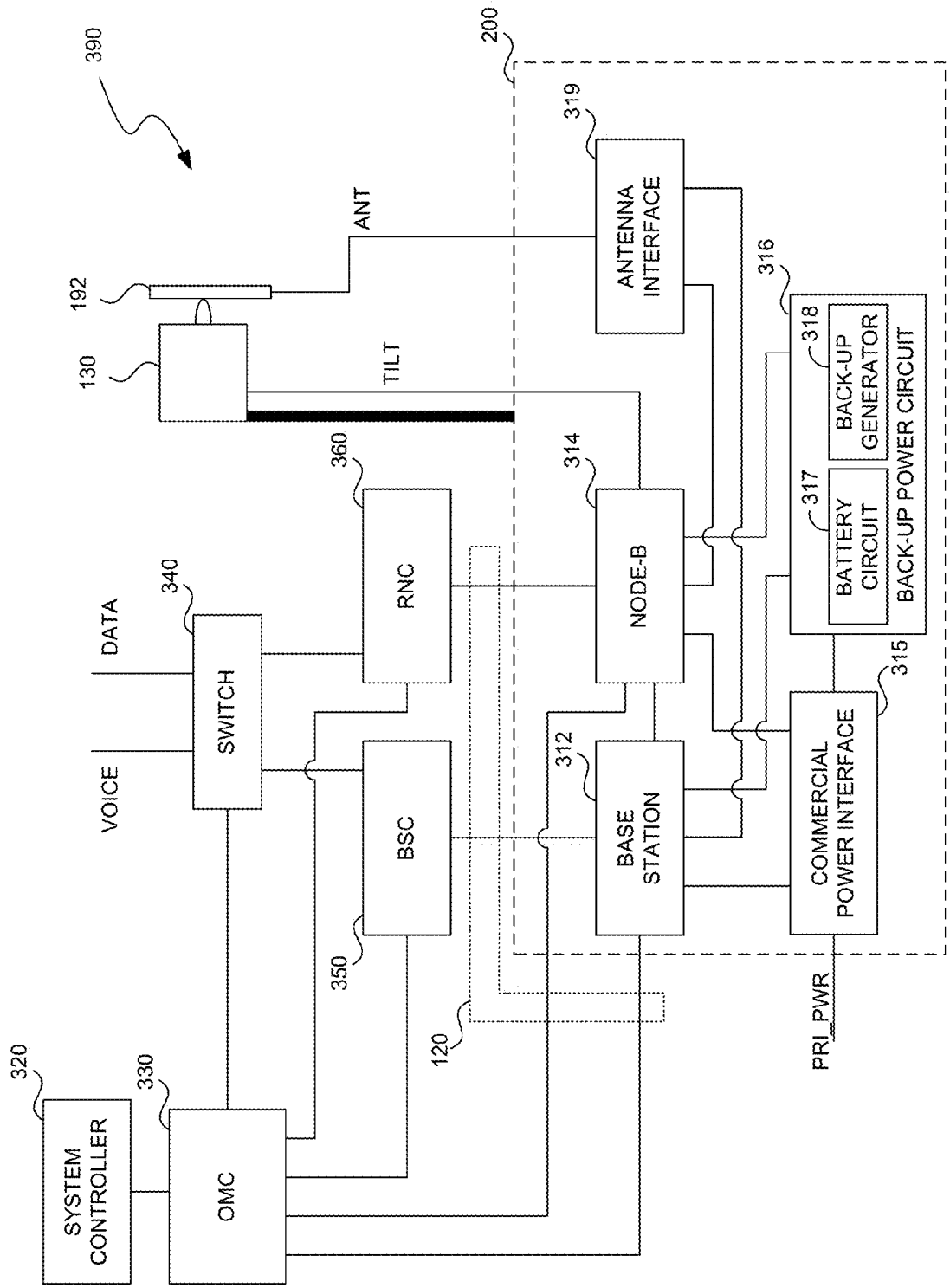
FIG. 3 is a block diagram of a communications system usable in the environments of FIGS. 1 and 2.

FIG. 3 is a block diagram of a communications system 390. The communications system 390 includes cell site 200, remote tilt mechanism 130, antenna 192, system controller 320, an operations and maintenance center ("OMC") 330, switch 340, base station controller 350, and RNC 360. Cell site 200 includes base station 312, Node-B 314, commercial power interface 315, back-up power circuit 316, and antenna interface 319. The backup power circuit 316 includes battery circuit 317 and back-up generator 318. The communications system 390 is illustrated as a GSM/UMTS communications system, however, the invention is not limited to GSM/UMTS communications systems. For example, the invention may also be practiced in an LTE and/or other fourth generation wireless environment.

The system controller 320 may be provided to control the communications system 390. For example, the system controller 320 may be a computer system programmed to control a core communications system, such as all or part of the communications system in a metropolitan market, a regional communications system, a commercial wireless communications service provider's entire network, etc. The system controller 320 may also be an interface for manually controlling the operations of a core communications system or the like. As one example, the system controller 320 is a computer system programmed to execute control scripts (e.g., Perl scripts, Tcl scripts, Python scripts, Ruby scripts, LabVIEW scripts, etc.) to control the OMC 330 and/or other elements. Likewise, a single system controller 320 may be employed to control multiple OMCs.

As illustrated, the OMC 330 is coupled to the system controller 320, the switch 340, the base station controller 350, the RNC 360, and the cell site 200. The OMC 330 may also be configured to provide a centralized platform from which a commercial wireless communications service provider may monitor and control operational aspects of the elements of the communications system 390. The OMC 330 may enable the control of both radio elements and switching elements of the communications system 390. The OMC 330 may be configured to manage any number of switches, base station controllers, RNCs, and cell sites.

The switch 340 may be coupled to the OMC 330, the base station controller 350, and the RNC 360. For example, the switch 340 may be configured to switch voice traffic from one or more base station controllers to a public switched telephone network (PTSN) or to a telephone switch such as a 5ESS switch, a Private Branch Exchange switch, and/or the like via signal VOICE. Likewise, the switch 340 may be further configured to switch data from one or more RNCs to a data network, to a router, to a switch, and/or the like via signal DATA. Also, the switch 340 may include a mobile switching center (MSC), a media gateway, a call gateway, and/or the like.

The base station controller 350 may be coupled between the switch 340 and the cell site 200 to control certain operational aspects of the base station 312 of the cell site 200. For example, the base station controller 350 may be configured to control handoffs, network registration for mobile devices, channel allocation, radio transmitter output power, and/or the like. Likewise, the base station controller 350 may be configured to adjust a C1 value based, at least in part, on control from the system controller 320 or the OMC 330. The base station controller 350 may be employed to control any number of base stations.

The RNC 360 may be coupled between the switch 340 and the cell site 200 to control certain operational aspects of the Node-B 314 of the cell site 200. Also, the RNC 360 may be employed to control any number of Node-Bs. As an example, the RNC 360 may be a UMTS counterpart of the base station controller 350.

As stated above, the cell site 200 may include base station 312, Node-B 314, commercial power interface 315, the backup power circuit 316, and antenna interface 319. The backup power circuit 316 may include the battery circuit 317 and the backup generator 318. In typical communications systems, the base station 312 and the Node-B 314 are configured to provide a low-level radio interface to wireless devices under the control of the base station controller 350 and the RNC 360. For example, the base station 312 may provide low-level GSM radio interfacing while the Node-B 314 provides low-level UMTS radio interfacing. Also, the cell site 200 may include limited command and control functionality or no command and control functionality. Instead, the base station controller 350 and/or the RNC 360 may provide such functionality while the cell site 200 merely provides a physical layer interface to associated mobile devices. Node-B 314 may also be configured to provide tilt signal TILT to remote tilt mechanism 130.

The commercial power interface 315 may receive power from a commercial power source via line PRI_PWR and provide the received commercial power to the base station 312, the Node-B 314, and the backup power circuit 316. The backup power circuit 316 may receive power from the commercial power interface 315 to charge/recharge the battery circuit 316, and the backup power circuit 316 may provide power to the base station 312 and the Node-B 314 during a power source's periods of reduced availability.

The cell site 200 may also include the antenna interface 319 to provide a physical interface between the base station 312, the Node-B 314, and the antenna 192. For example, the antenna interface 319 may be a smart bias tee that is configured to physically interface the RF signals between the base station 312, the Node-B 314, and the antenna 192. A smart bias tee may be further adapted to provide power to a receiver preamplifier in the antenna 192.

In other examples, the antenna interface 319 may include duplexers, diplexers, multiplexers, and/or the like. Also, the antenna interface 319 may be omitted in certain cell sites. For example, the base station 312 may be configured to receive RF signals from the Node-B 314, and to couple these and other RF signals to the antenna 192.

In operation, the communications system 390 is configured to enable and disable various power conservation features at the cell site 200 based, at least in part, on a power source availability status, as discussed above. As one example, power conservation features may be enabled and disabled by the system controller 320 or the OMC 330. However, in other communications systems, power conservation features may also be controlled by the switch 340, the base station controller 350, the RNC 360, or within the cell site 200. Likewise, tilt signal TILT may be provided to the remote tilt mechanism 130 from a suitably equipped base station 312 and/or the like.

Illustrative Logical Diagram

Figure 4:
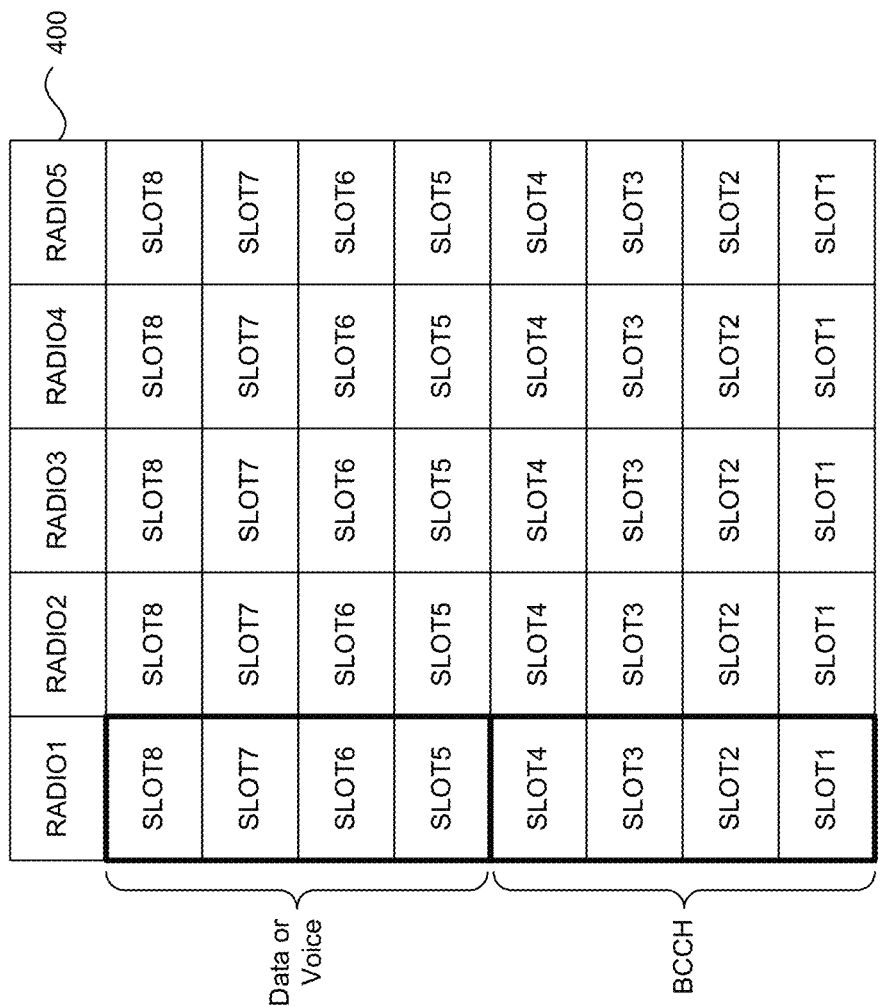
FIG. 4 is a logical diagram of a radio shelf usable in the base station of FIG. 3.

FIG. 4 is a logical diagram of a radio shelf 400 usable in the base station 312 of FIG. 3. As shown, the radio shelf 400 includes radios RADIO1-RADIO5. Each of radios RADIO1-RADIO5 includes logical slots SLOT1-SLOT8.

As discussed above, the cell site 200 may be configured to reallocate communications between radios and logical slots of the cell site 200 based, at least in part, on a power source availability status and on environmental parameters.

As one example, RADIO1 is a broadcast control channel ("BCCH") radio that is configured to broadcast base station identification, synchronization data, control information, other data, and/or the like, over one or more BCCH logical slots. In a typical system, these BCCH slots are broadcast at full power to provide increased visibility of the cell site 200 throughout its service area. Accordingly, other logical slots of the BCCH radio and/or near the BCCH slot may experience increased interference due to adjacent channel interference, inter-symbol interference, and/or the like.

In one system, SLOT1-SLOT4 of RADIO1 are employed to transmit BCCH data while SLOT5-SLOT8 of RADIO 1 are left unused, or employed to transmit lower priority traffic. Lower priority traffic may include traffic that does not substantially benefit from low latency transmission and may include Short Message Service (SMS) messages, wireless data, and/or the like. For example, such allocation may improve C/I for other logical slots allocated to higher priority voice traffic. Also, radios and logical slots allocated to voice traffic may employ RF output transmit power control on a per connection (e.g., voice call) or per logical slot basis to increase the C/I for other logical slots.

However, during a period of reduced power source availability, the benefits of increased C/I may be outweighed by power conservation requirements. Accordingly, voice traffic may be transmitted from the BCCH radio to reduce the number of operating radios. Likewise, the bit-rate of voice traffic may also be decreased to "pack" additional voice calls onto the BCCH radio. For example, SLOT5-SLOT8 of RADIO1 may be employed to enable 8 half-rate voice calls.

Illustrative Logical Flow Diagram

Figure 5:
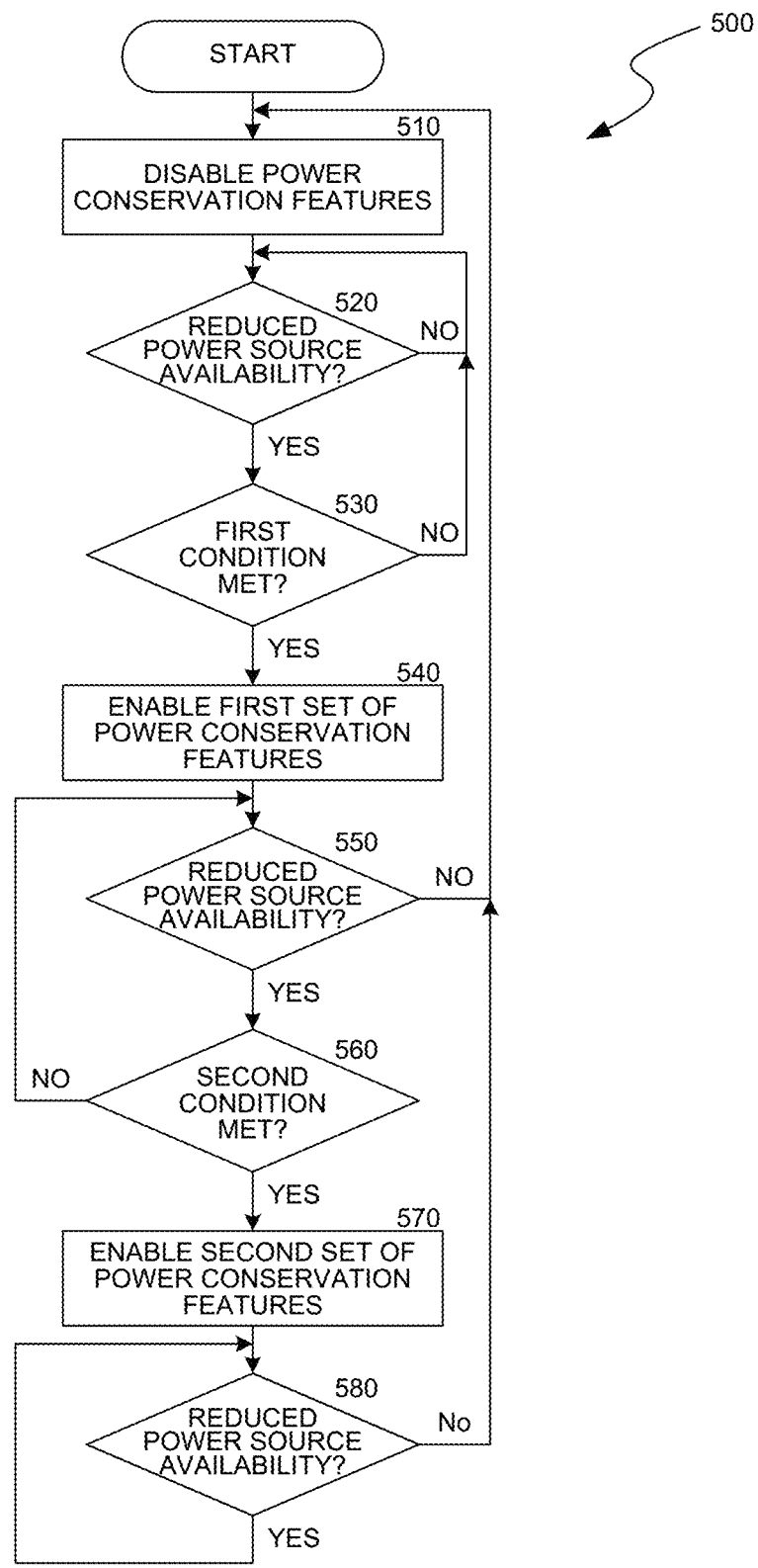
FIG. 5 is a logical flow diagram of a process for conserving power in a communications system.

FIG. 5 is a logical flow diagram of a process 500 for conserving power in a communications system. For clarity, the process 500 is described below as being performed by particular elements of the communications system 390 of FIG. 3. However, the process 500 may also be, for example, performed by other processors, by other elements, or in other systems whether such processors, elements, or systems are described herein. In addition, the process 500 may be stored in non-volatile memory.

Flowing from a start block, processing begins at step 510 where the cell site 200 disables power conservation features. For example, the system controller 320, the OMC 330, the switch 340, the base station controller 350, and/or the RNC 360 may instruct the cell site 200 to disable power conservation features. As discussed above, the cell site 200 may operate with power conservation features disabled to increase call quality and/or the like, while the cell site 200 is powered from a commercial power source. In addition, the OMC 330 or the system controller 320 may also clear alarms at step 510.

At decision block 520, the cell site 200 determines the availability of a power source. Also, the cell site 200 may transmit an alarm to the OMC 330, report reduced availability to the system controller 320, and/or the like. The cell site 200 may transmit the alarm, signal, or report on backend interface 120, on an over-the-air interface, and/or the like. Within the cell site 200, the base station 312 may determine the power source availability. However, in other cell sites, the Node-B 314 and/or other elements may determine the power source availability status. If the cell site 200 determines that there is reduced power source availability, processing flows to decision block 530. Otherwise, processing stays at decision block 520.

At decision block 530, the system controller 320 or the OMC 330 determines if a first condition is met. Table 2, below, includes some example of possible conditions.

TABLE 2 power conservation conditions.

| | |
|---|---|
| 1 | a duration of reduced power source availability (e.g., zero minutes, 10 minutes, etc.) |
| 2 | the quantity (e.g., number or percentage) of cell sites, sectors, radios, and/or the like experiencing reduced power source availability |
| 3 | a status of a backup power supply |
| 4 | the load (e.g., number of connected calls, amount of data traffic, volume of communications, etc.) on the cell site |

The system controller 320 or the OMC 330 may monitor these and other conditions. If the system controller 320 or the OMC 330 determines that the first condition is met, it moves processing to step 540. Otherwise, it returns processing to decision block 520.

In one system, the system controller 320 moves processing to step 540 after the cell site 200 has operated from backup power for 10 minutes, after a voltage of the backup power supply changes to −54 volts, when five cell sites or 10% of cell sites in a geographical area experience reduced power source availability, and/or the like. In another system, the system controller 320 moves processing to step 540 after the cell site 200 has operated from backup power for 15 minutes. Such a delay time may be employed to confirm and/or ensure that reduced power source availability is due to, for example, a power outage. However, any other suitable thresholds and/or conditions may be employed.

At step 540, the cell site 200 enables a first set of power conservation features. As one example, the system controller 320 may transfer traffic to the BCCH radio. In another example, the system controller 320 may alternately or additionally up-tilt the antenna 192 by approximately 2° while reducing the RF output transmit power by 2 dB. In yet another example, a cell site without an electrically tiltable antenna may employ other power conservation. For example, a cell site may reduce the transmit power for the BCCH radio by 2 dB while adjusting a C1 value and/or a receiver access minimum value to maintain the communications range of the cell site while conserving power. Processing continues at decision block 550.

Conditions may be selected from Table 2 and corresponding power conservation factors may be selected from Table 1 by a network administrator, defined in a configuration or script file, dynamically determined via machine learning (e.g., artificial intelligence), and/or the like.

At decision block 550, the cell site 200 determines if there is reduced power source availability (e.g., an outage has not ended). As discussed above, this determination may, for example, be made by the base station 312 or the Node-B 314. If the cell site 200 determines that there is reduced power source availability, processing flows to decision block 560. Otherwise, processing flows to step 510. Some or all of the power conservation features may also remain enabled for a period of time after the cell site 200 detects the end of the reduced power source availability. Such a delay may be employed to confirm and/or ensure that the power source is providing stable power, to provide additional charging current to a backup battery circuit, and/or the like. In one system, a delay of 30 minutes is employed before processing flows to step 510. However, no delay, or any other suitable delay, may be employed in other systems.

At decision block 560, the cell site 200 determines if a second condition has been met. As discussed above, this determination may, for example, be made by the base station 312 or the Node-B 314. The second condition may include conditions discussed above with regard to decision block 530 and Table 2. The system controller 320 or the OMC 330 may be employed to determine if the second condition is met and may employ different thresholds, combinations of conditions, and/or the like to determine if the second condition is met. If the system controller 320 or the OMC 330 determines that the second condition is met, it moves processing to step 570. Otherwise, it returns processing to decision block 550.

In one system, the system controller 320 moves processing to step 540 after the cell site 200 has operated from backup power for 20 minutes, after the voltage of the backup power supply changes to −52 volts, when seven cell sites or 5% of cell sites in a geographical area experience reduced power source availability, and/or the like. However, any other suitable thresholds and/or conditions may be employed.

At step 570, the cell site 200 enables a second set of power conservation features. Step 570 may include enabling additional power conservation features or may include changing parameters of the first set of power conservation features to further increase power conservation, such as those selected from Table 1, above.

As one example, the system controller 320 may transfer traffic to the BCCH radio, up-tilt the antenna 192 by approximately 4°, and reduce the RF output transmit power 4 dB. Processing continues at decision block 550. Such a change can reduce the total power consumption of a 15 transceiver cell site from approximately 40 amperes to approximately 27 amperes as approximately a 32% decrease in power consumption while maintaining the cell site's coverage area. As discussed above, any other suitable elevation difference angles may be employed.

Processing then continues at decision block 580 where the cell site 200 determines if there is reduced power source availability (e.g., an outage has not ended). If the cell site 200 determines that there is reduced power source availability, processing remains at decision block 580. Otherwise, processing returns to block 510. As discussed above, some or all power conservation features may remain enabled for a period of time after cell site 200 detects the end of the reduced power source availability.

Illustrative Cell Site System

Figure 6:
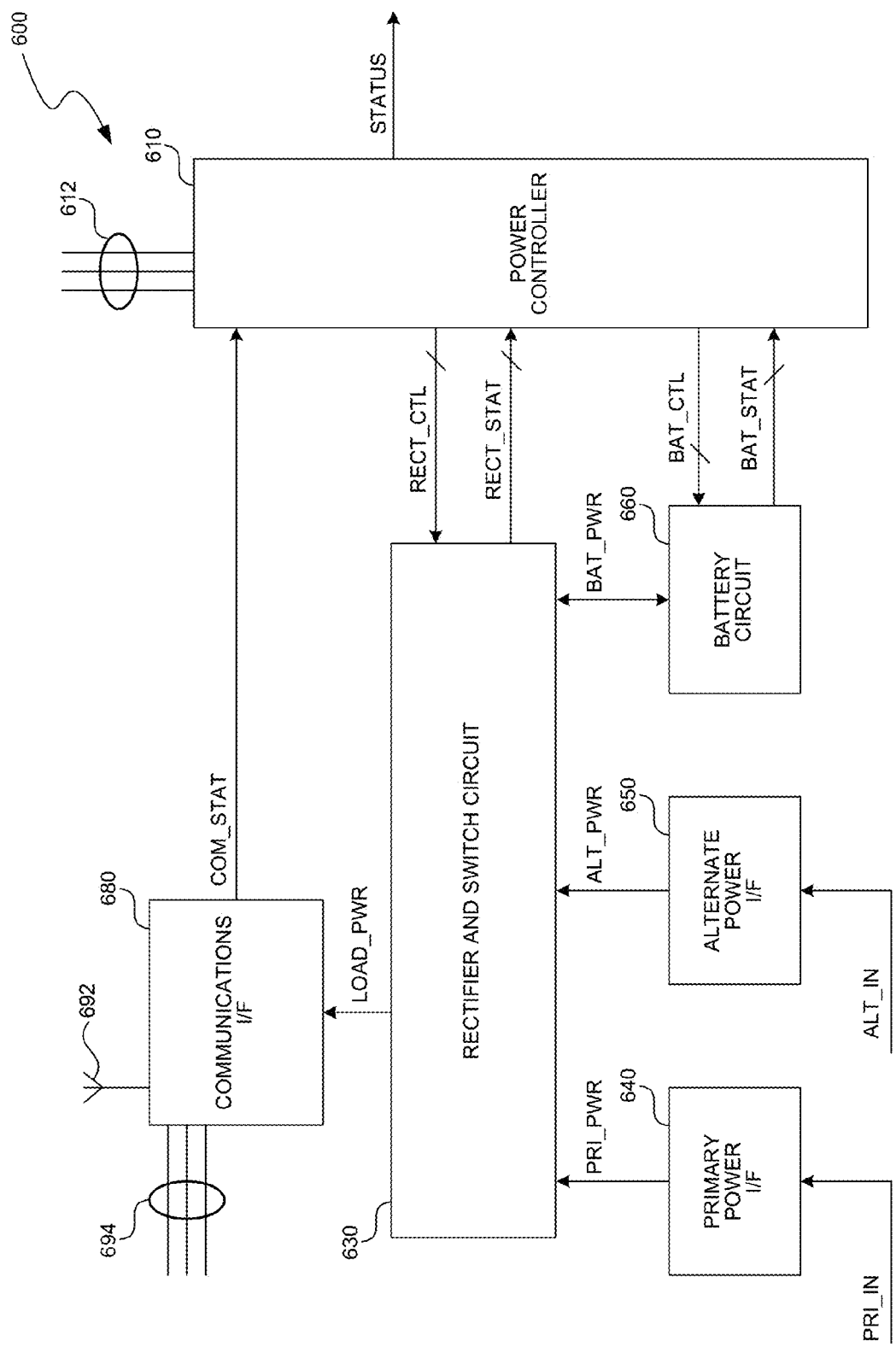
FIG. 6 is a block diagram of a suitable cell site for use in the environment of FIG. 1.

FIG. 6 is a block diagram of a portion of a cell site 600. The cell site 600 includes a power controller 610, a rectifier and switch circuit 630, a primary power interface 640, an alternate power interface 650, a battery circuit 660, and a communications interface 680. The cell site 600 may be employed as an embodiment of the cell site 100 of FIG. 1.

The power controller 610 is configured to control the power systems of the cell site 600. As illustrated, the power controller 610 is configured to receive or provide control signals 612, to receive status signals COM_STAT, RECT_STAT, and BAT_STAT, and to provide output/control signals RECT_CTL, BAT_CTL, and STATUS, as discussed below.

The power controller 610 is configured to manage and control the operation of the rectifier and switch circuit 630 and the battery circuit 660 based, at least in part, on the various status and output/control signal inputs. For example, when a primary power signal is available to the system, the power controller 610 may utilize output/control signals RECT_CTL and BAT_CTL to coordinate the charging and/or testing of the battery circuit 660. When primary power signal PRI_IN and/or alternate power signal ALT_IN fails (e.g., during a power outage), the power controller 610 may utilize output/control signals RECT_CTL and BAT_CTL to route battery power from the battery circuit 660 to the communications interface 660 and/or the power controller 610. As another example, the power controller 610 may, in accordance with an applicable rotation policy (described herein), utilize output/control signals RECT_CTL to rotate which rectifiers are in active, online operation within the rectifier and switch circuit 630. The operation of the power controller 610 is discussed in further detail with regard to FIG. 7.

The rectifier and switch circuit 630 is configured to selectively route power between and/or among the primary power interface 640, the alternate power interface 650, the battery circuit 660, the communications interface 680, and the power controller 610. For example, the rectifier and switch circuit 630 may be configured to selectively power the communications interface 680 from one or more of the primary power interface 640, the alternate power interface 650, and/or the battery circuit 660. In addition, the rectifier and switch circuit 630 may be further configured to route operational power to the power controller 610 (power connection line not shown).

The power controller 610 may control the rectification, switching, charging, and other operations of the rectifier and switch circuit 630 via output/control signals RECT_CTL. The rectifier and switch circuit 630 may be configured to provide the status signals RECT_STAT to the power controller 610, for example, to indicate the status of rectifiers, inverters, chargers, switches, power source outputs, failure conditions (e.g., rectifier failure, inverter failure, switch failure, excessive current draw, out of range inputs/outputs, etc.), and/or the like. As one example, the status signals RECT_STAT may provide an indication of the various output currents produced by one or more rectifiers in the rectifier and switch circuit 630. The status signals RECT_STAT may be provided to the power controller 610 to enable the power controller 610 to adjust the operation of the rectifier and switch circuit 630 based on these and other conditions such as the status of the primary power signal PRI_IN, temperatures in the cell site 100, the status of the alternate power signal ALT_IN, and/or the like.

The rectifier and switch circuit 630 may include switching devices of any type (e.g., field-effect transistors, insulated gate bipolar transistors, junction field-effect transistors, bipolar-junction transistors, relays, transmission gates, etc.) that are configured to selectively switch (e.g., route) power among the elements of the cell site 600. In addition, the rectifier and switch circuit 630 may also include one or more rectifiers configured to rectify AC power from the primary power interface 640 and/or the alternate power interface 650 to provide DC power to the communications interface 680, the battery circuit 660, and/or the power controller 610.

Further, rectifiers, switches, and/or other circuitry of the rectifier and switch circuit 630 may be configured to selectively charge the battery circuit 660 from the primary power interface 640 and/or the alternate power interface 650. For example, the rectifier and switch circuit 630 may include and/or be configured as a trickle charger, a constant current charger, a constant voltage charger, a constant current/constant voltage charger, a delta-V charger, and/or the like, and/or a combination of these.

One suitable example of a rectifier and switch circuit 630 is described in greater detail below with respect to FIG. 8.

The primary power interface 640 may be configured to couple the primary power signal PRI_IN to the rectifier and switch circuit 630 via a power signal PRI_PWR, for example, to power the communications interface 680, to charge the battery circuit 660, and/or the like. The primary power interface 640 may include a circuit breaker, line filter, surge protector, power meter, and/or the like. However, in one embodiment, the primary power interface 640 may simply be a wire segment connecting the primary power signal PRI_IN to the rectifier and switch circuit 630.

Likewise, the alternate power interface 650 may be configured to receive power from an alternate energy source and couple the received power to the rectifier and switch circuit 630 via power signal ALT_PWR. For example, the alternate power interface 650 may be configured to receive DC power from a photovoltaic power source and/or a generator. As one example, the alternate power interface 650 may be interfaced to a generator as discussed in further detail by U.S. patent application Ser. No. 12/170,675, entitled "CELL SITE POWER GENERATION," filed on Jul. 10, 2008. In other examples though, the alternate power interface 650 may be configured to receive power from virtually any power source, such as those discussed above.

The alternate power interface 650 may include a circuit breaker, line filter, surge protector, power meter, and/or the like. However, the alternate power interface 650 may simply be a wire segment connecting alternate power signal ALT_IN to the rectifier and switch circuit 630.

The battery circuit 660 is configured to store power provided by the primary power interface 640 and/or the alternate power interface 650 in any number of batteries or other electrical energy storage devices (e.g., ultracapacitors, supercapacitors, other capacitors, inductors, etc.), which may be arranged in any combination of series configurations, parallel configurations, and/or series and parallel configurations. In one example, the battery circuit 660 includes multiple strings of serially connected batteries. As illustrated, the battery circuit 660 is coupled to the rectifier and switch circuit 630 via a battery power signal BAT_PWR. The battery circuit 660 is also coupled to the power controller 610 via output/control signals BAT_CTL and status signals BAT_STAT.

In one example, the battery circuit 660 has at least one battery string that comprises four serially connected batteries that together form a negative 48 volt ("V") string that has an approximate suitable float voltage of 54 V. In one implementation, the battery circuit 660 comprises serially connected absorbed glass mat ("AGM") batteries that are sealed valve-regulated, such as the SBS-S series or VRLA batteries available from Storage Battery Systems® Inc. In another implementation, the battery circuit 660 comprises serially connected carbon nanotube ("CNT") batteries. However, other batteries and/or energy storage devices such as other types of AGM batteries, gel cell batteries, other deep cycle batteries, flooded lead-acid batteries, nickel-metal-hydride batteries, nickel-cadmium batteries, lithium-ion batteries, lithium-polymer batteries, alkaline batteries, capacitors, and/or the like, may also be suitably employed.

In one implementation, the battery circuit 660 is configured to provide two different output signals each having a different voltage. For example, the battery power signal BAT_PWR may comprise two different battery power signals that may be routed by the rectifier and circuit switch 630 to power two different loads (e.g. two different subsystems of the communications interface 680, such as a GSM subsystem and a UMTS subsystem). For example, the battery power signal BAT_PWR may comprise a BAT_PWR_24 signal carrying a 24 V signal and a BAT_PWR_48 signal carrying a negative 48 V signal. In such implementations, the battery circuit 660 comprises at least one string of serially connected batteries having a native voltage (e.g., 24 V) and a doubling switching circuit (e.g., an H-bridge coupled to a capacitor, inductor or both) configured to produce an output that is approximately double the native voltage of the battery string (e.g., 48 V). Alternatively, the doubling switching circuit may be implemented within the rectifier and switch circuit 630. In these implementations, during a power failure, the native voltage of the battery string may directly power those loads that require a lower voltage power source (e.g., by providing a 24 V voltage source to a GSM subsystem via a BAT_PWR_24 signal). In such implementations, during a power failure, the power controller 610 may also produce a higher (i.e., doubled) voltage output signal at an output node by instructing an H-bridge or similar switching circuit (via output/control signals BAT_CTL and/or RECT_CTL) to up-convert the voltage of the battery string by repeatedly coupling the output node (1) first, to a first end of the battery string, and (2) second, to the other end of the battery string (with the polarity reversed). The doubling switching circuit may further comprise a capacitor, inductor, and/or or other energy storage device to store energy and to smooth out the doubled voltage.

For example, one string of multiple individual batteries that together produce 24V at an output node may be doubled by the switching circuit to produce 48V at a different output node. Such control of individual battery strings may be implemented by the BAT_CTL signal from the power control 610. In this way, for example, the power controller 610 may provide a (positive or negative) 24 V voltage source to legacy GSM subsystems via a BAT_PWR_24 signal and a negative 48 V voltage source to next-generation UMTS or LTE subsystems via a BAT_PWR_48 signal. In such implementations, due to a floating ground that is employed to facilitate the voltage up-conversion, the two subsystems that utilize the two different power signals must be electrically isolated. Since switching circuits such as H-bridges have relatively low losses, the conversion efficiency in such implementations may be higher than other systems that utilize an inverter to perform DC-DC conversion.

The battery circuit 660 may additionally comprise one or more temperature sensors configured to provide measured temperatures in or near the battery circuit 660 to the power controller 610 via battery status signals BAT_STAT so that the power controller 610 may calculate or adjust operating, charging, or testing values and/or other parameters that are temperature-dependent (e.g., the number of rectifiers to operate, suitable float voltages, charging voltages or currents, estimated battery charge, etc.).

The communications interface 680 is configured to interface wireless devices to a back-haul 694 via an antenna 692. The communications interface 680 typically includes both digital and RF electronics. In one embodiment, the communications interface 680 includes an RF transceiver and digital control circuitry. However, other components may also be associated with a transceiver and/or other circuits. The communications interface 680 is powered from the rectifier and switch circuit 630 via line LOAD_PWR and is configured to provide status signal COM_STAT to indicate an operational status such as failure of back-haul 694, the number of wireless devices associated with cell site 600, power consumption data, and/or the like.

Power Controller Examples

Figure 7:
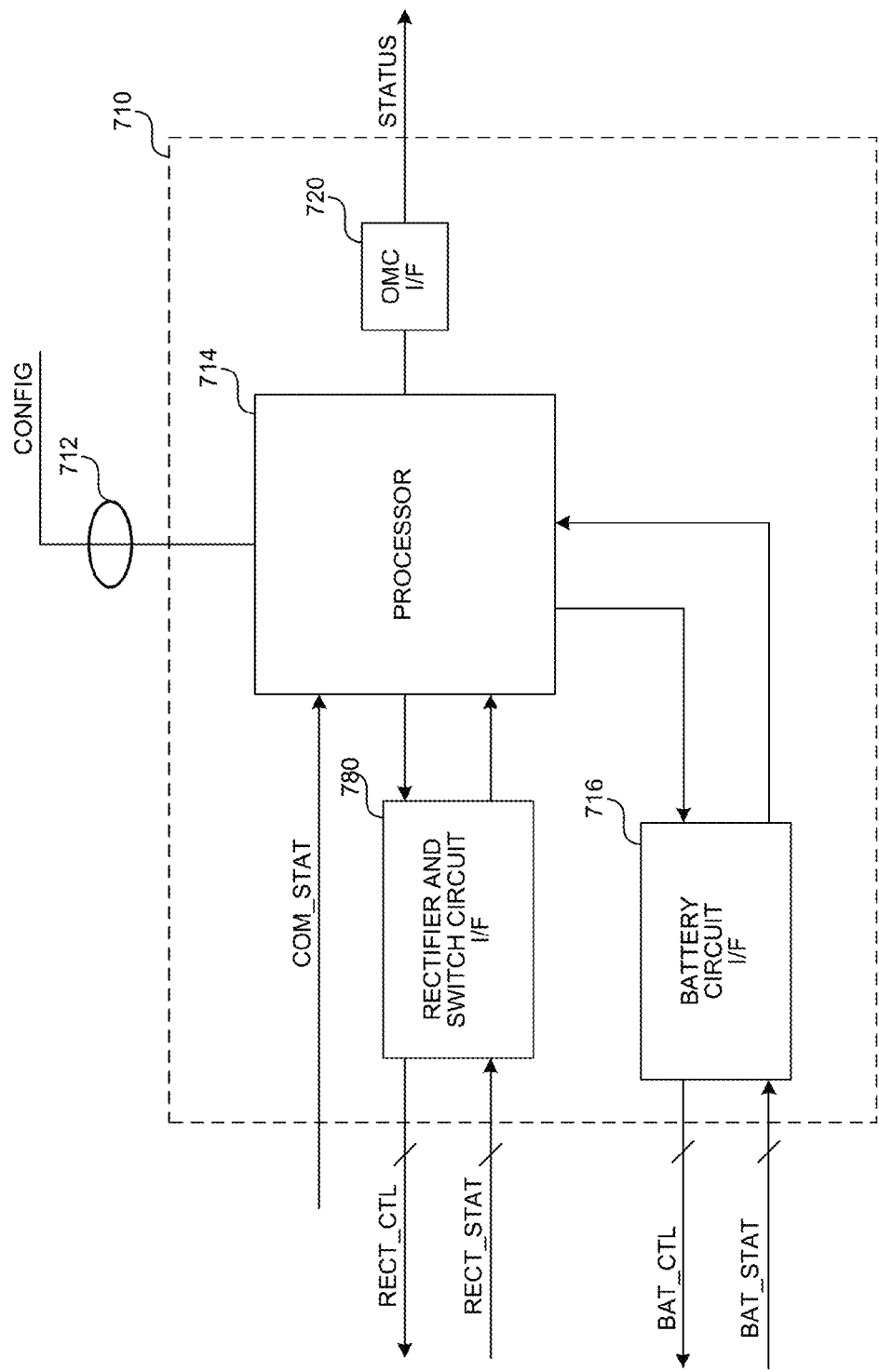
FIG. 7 is a block diagram of a suitable power controller usable in the cell site of FIG. 6.

FIG. 7 is a block diagram of a power controller 710. The power controller 710 includes a processor 714, a battery circuit interface 716, a rectifier and switch circuit interface 780, and an operation, management, and control (OMC) interface 720, and may be configured to receive or provide control signals 712. The power controller 710 may be employed as an embodiment of the power controller 610 of FIG. 6. The power controller 710 may also be employed in systems other than the systems of FIGS. 1-6.

As illustrated, the processor 714 is configured to control the operations of the rectifier and switch circuit 630, including selective switching and testing of rectifiers, via a rectifier and switch circuit interface 780 and control signals RECT_CTL. The processor 714 is also configured to receive rectifier status signals RECT_STAT. In addition, processor 714 may interface with the battery circuit 660 (e.g., via battery circuit interface 716, battery status signals BAT_STAT, and battery control signals BAT_CTL) to control the operations of the battery circuit, including selective switching, charging, testing, and power failure handling of battery strings within the battery circuit. The processor 714 is further configured to provide a status signal to a remote system (e.g., via OMC interface 720 and status signal STATUS).

The processor 714 is further configured to receive a configuration signal CONFIG to represent a hardware configuration, to set various threshold levels, operational parameters, and/or the like. Any number of configuration signals may be provided. In one embodiment, configuration signals are employed to represent the number and/or types of rectifiers in the rectifier and switch circuit 630, the alternate power source coupled to the alternate power interface 650, the number of battery strings in the battery circuit 660, the types of batteries in the battery circuit 660, the capacities of batteries in the battery circuit 660, the desired output voltage at one or more nodes for the battery strings, and/or the like. As another example, a configuration signal may be provided to indicate the load capacity of the rectifiers in the rectifier and switch circuit 630, so that the processor 714 may more accurately determine the number of active/online rectifiers needed to provide efficient rectification.

Figure 9:
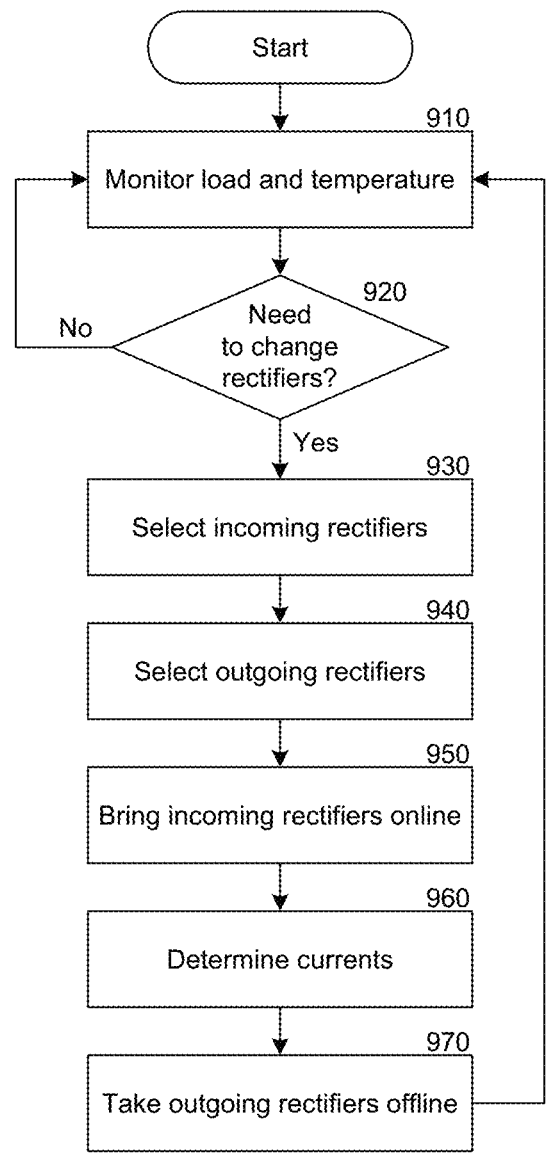
FIG. 9 is a logical flow diagram of a suitable process for managing a rectifier and switch circuit having multiple rectifiers.

As yet another example, a configuration signal is employed to set or establish an applicable rotation policy or schedule that specifies a set of preferences, policies, schedules, procedures, and other information regarding how the power controller 710 should perform the process 900 of FIG. 9 for managing the rectifier and switch circuit 630. For example, a configuration signal may be employed to set various rotation policy parameters and/or indicate how the power controller 610 should calculate various rotation policy parameters, including: delta values; threshold values; metrics used; a rectifier rotation or selection schedule, sequence, order, or strategy; turn on delays; turn off delays; threshold temperatures; current ranges; and/or testing times. The various rotation policy parameters and methods for selecting or calculating these policy parameters are described in greater detail herein with respect to FIG. 9.

The configuration signal CONFIG may be provided from a switch (e.g., a DIP switch), pull-up resistors, pull-down resistors, jumpers, and/or the like. Alternatively, similar configuration information may be read by the processor 714 from a memory or be received from another processor.

The processor 714 is also configured to receive various status signals and provide various control signals as illustrated in FIG. 7 in order to manage and control the operation of the rectifier and switch circuit 630. For example, status signals COM_STAT, RECT_STAT and BAT_STAT may be employed to represent the status of the communications interface 680, the rectifier and switch circuit 630, and the battery circuit 660, respectively. The processor 714 may also provide control signals RECT_CTL, which may further comprise three sets of multiple control signals described in greater detail herein, including RECT_CTL_STATE signals to control the operational state (e.g., output voltage) of rectifiers within the rectifier and switch circuit 630, RECT_CTL_SRC signals to control which input power signal is rectified by the rectifiers, and RECT_CTL_CPL signals to control which rectifiers are coupled to a load. The various status signals and control signals are described in additional detail with respect to FIGS. 6 and 8.

The processor 714 may be a microprocessor, a microcontroller, a digital signal processor (DSP), and/or the like. However, in other embodiments, digital logic, analog logic, combinations of digital logic and analog logic, and/or the like may also be employed instead of a processor. For example, such embodiments may be implemented in a field-programmable gate array (FPGA), in an application-specific integrated circuit (ASIC), in other programmable logic devices (PLDs), and/or the like.

A rectifier and switch circuit interface 780 is configured to interface the processor 714 with the rectifier and switch circuit 630 of FIG. 6. For example, the rectifier and switch circuit interface 780 interfaces status signals RECT_STAT from the rectifier and switch circuit 630 to the processor 714 (e.g., to sense the conditions of each rectifier in the rectifier and switch circuit 630, such as output currents) and interfaces the power controller 710 to rectifier control signals RECT_CTL (e.g., to select which rectifiers in the rectifier and switch circuit 630 are in active online operation). For example, the rectifier and switch circuit interface 780 may include multiplexers, drivers, buffers, logic gates, analog circuits, and/or other logic or circuitry to perform sampling, multiplexing, demultiplexing, conversion, and/or the like. As one example, the rectifier and switch circuit interface 780 includes an array of analog to digital converters ("ADCs") that are configured to digitize each of the status signals RECT_STAT and drivers configured to drive each of rectifier control signals RECT_CTL.

The battery circuit interface 716 is configured to interface the processor 714 with the battery circuit 660 of FIG. 6. For example, the battery circuit interface 716 interfaces battery status signals BAT_STAT from the battery circuit 660 to the processor 714 (e.g., to sense conditions of each battery string in the battery circuit 660) and interfaces the power controller 710 to battery control signals BAT_CTL (e.g., to select which strings of the battery circuit 660 are coupled to the rectifier and switch circuit 630). For example, the battery circuit interface 716 may include multiplexers, drivers, buffers, logic gates, analog circuits, and/or other logic or circuitry to perform sampling, multiplexing, demultiplexing, conversion, and/or the like. As one example, the battery circuit interface 716 includes an array of ADCs that are configured to digitize each of battery status signals BAT_STAT and drivers configured to drive each of battery control signals BAT_CTL.

The OMC interface 720 is configured to interface the processor 714 to a remote system, and to provide operational data regarding the cell site and/or the cell site power system to the remote system. The OMC interface 720 may include drivers, buffers, inverters, logic gates, network interface units, multiplexers, and/or the like. Likewise, the OMC interface 720 may be configured to multiplex the status signal STATUS onto the back-haul 694 or may provide the status signal STATUS as a discrete signal.

Example Rectifier and Switch Circuit

Figure 8:
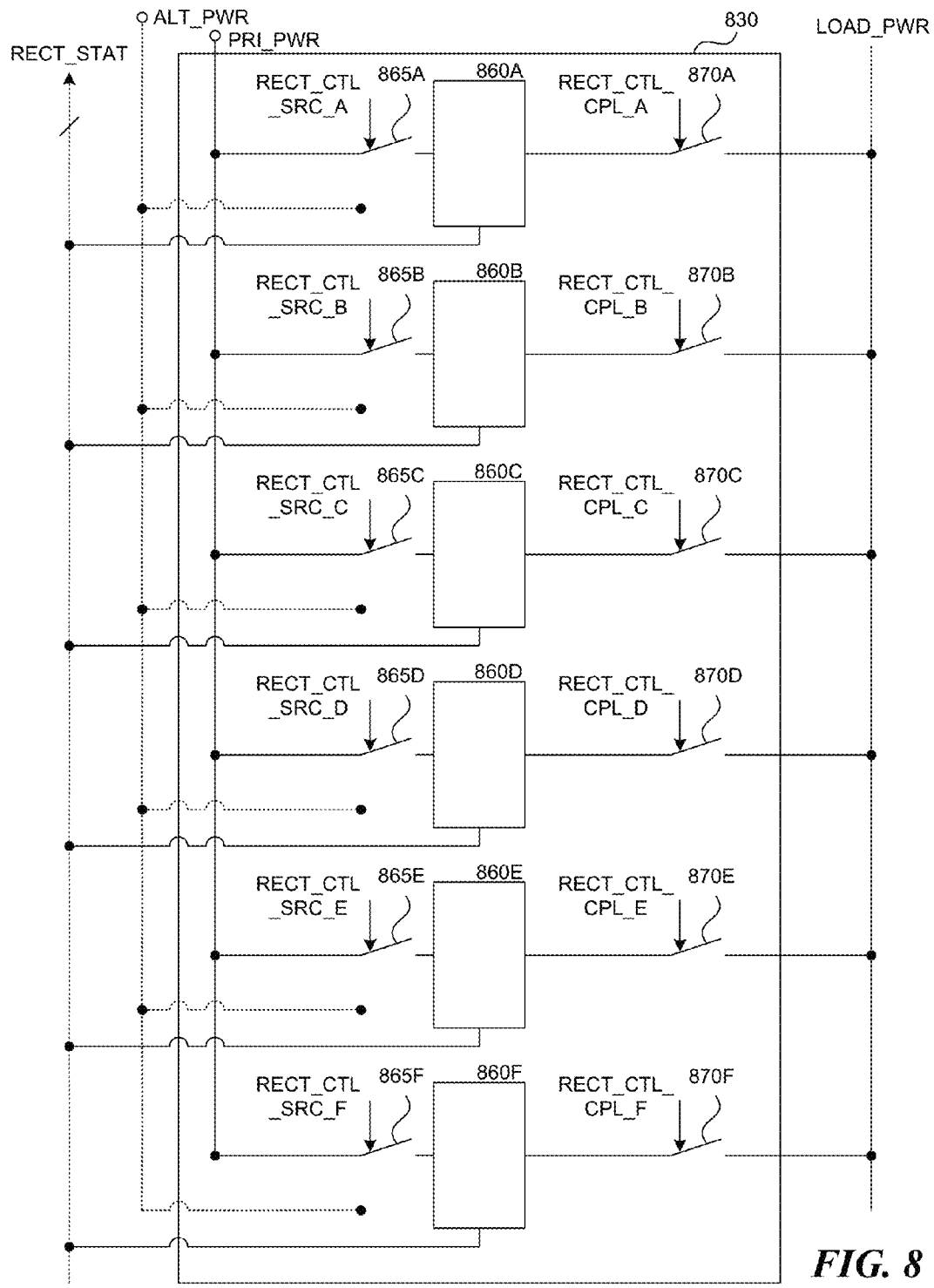
FIG. 8 is a schematic diagram of a suitable rectifier and switch circuit usable in the cell site of FIG. 6.

FIG. 8 is a schematic diagram of a portion of a suitable rectifier and switch circuit 830, which may comprise multiple rectifiers 860, rectifier source switches 865, and rectifier load switches 870. The rectifier and switch circuit 830 may be employed as an embodiment of the rectifier and switch circuit 630 of FIG. 6. The rectifier and switch circuit 830 may also be employed in systems other than the systems of FIGS. 1-6.

As illustrated, the rectifier and switch circuit 830 includes six rectifiers 860A-F. Although six rectifiers are shown, two or more rectifiers 860 may be employed in the rectifier and switch circuit 830. Each rectifier is configured to rectify input power before providing it to a load. Each rectifier may be rated or otherwise configured to provide a maximum output current (or "capacity") and/or maximum output voltage. In some examples, the rectifiers each have a capacity between approximately 30 Amps ("A") and 40 A. The various rectifiers 860 may have different capacities; for example, the rectifier and switch circuit 860 may comprise two 30 A rectifiers 860, two 40 A rectifiers 860, and two 50 A rectifiers 860. As previously described, the power controller 610 may control the operational state of each of the rectifiers (e.g., whether the rectifier is on/off, the output voltage, the output current, and other operational parameters) via control signals RECT_CTL_STATE (not shown in FIG. 7).

As shown, each rectifier 860 may be arranged in series with a multi-position rectifier source switch 865 that selectively couples the rectifier 860 to one or more rectification input source signals, such as PRI_PWR or ALT_PWR. As shown, each rectifier source switch 865 is controlled by a control signal RECT_CTL_SRC (e.g., rectifier source switch 865 A is controlled by the control signal RECT_CTL_SRC A). Each rectifier 860 may also be arranged in series with a rectifier load switch 870 that selectively couples the rectifier 860 to a load line LOAD_PWR. As shown, each rectifier load switch 870 is controlled by a control signal RECT_CTL_CPL (e.g., rectifier load switch 870A is controlled by the control signal RECT_CTL_CPL A). Rectifier source switches 865 and rectifier load switches 870 may be implemented by switching devices of any type (e.g., field-effect transistors, insulated gate bipolar transistors, junction field-effect transistors, bipolar-junction transistors, relays, transmission gates, etc.). In some examples, one or more rectifier source switches 865 and/or rectifier load switches 870 may be omitted so that a rectifier 860 is directly and continuously coupled to only a single input power signal and/or a single load.

When a new rectifier 860 is deployed within the rectifier and switch circuit 830, the power controller 610 may record the time and/or date of deployment in an index or other data structure that correlates deployment times, failure times, applicable warranty periods, serial numbers, and/or other similar information. Alternatively, or additionally, the power controller 610 may send this information to a remote monitoring location. In this way, the power controller 210, via regular testing of the rectifiers 860, may detect when a rectifier 860 failure indicates that a warranty remedy is available (e.g., a free replacement rectifier, free service, a refund, etc.) and may take steps towards claiming any warranty remedy (e.g., by notifying a remote monitoring location of the warranty remedy and/or otherwise).

Example Process

FIG. 9 is a logical flow diagram of a suitable process 900 for managing the rectifier and switch circuit 630 having multiple rectifiers 860. For clarity, the process 900 is described below as being performed by the power controller 610 of FIG. 6. However, the process 900 may also be performed by the processor 714 of the power controller 710, another component of the cell site 100 or the cell site 200, or another remote component (e.g., at a remote monitoring location).

The process 900 may also be performed by other processors, by other components, or in other systems, whether or not such processors, components, or systems are described herein. The process 900 may also be embodied on processor and/or computer readable media such as non-volatile memory, volatile memory, and/or the like. The flow diagram does not show all functions or exchanges of data, but instead it provides an understanding of commands and data exchanged under the system. Those skilled in the relevant art will recognize that some functions or exchange of commands and data may be repeated, varied, omitted, or supplemented, and other (less important) aspects not shown may be readily implemented.

Aspects of the invention may be stored or distributed on tangible or non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

In the process 900 of FIG. 9, the power controller 610 determines when and how to rotate rectifiers 860 into and out of an online state and implements the determined rotation. As described previously, during the process 900, the power controller 610 may utilize a rotation policy that specifies a set of preferences, policies, parameters, schedules, procedures, and other information. A rectifier 860 is "online" when it is both actively rectifying an input source and providing a desired output voltage and current that powers a load; it is "offline" when it is not. During the process 900, the power controller 610, in accordance with a rotation policy or schedule, may rotate rectifiers 860 in a manner that approximately balances or equalizes the cumulative runtimes (e.g., the total time spent in an online state) of the various rectifiers. By balancing the runtimes, the process 900 may reduce the mean time between failures for the rectifier and switch circuit 630, which may reduce maintenance calls and/or cell site 100 outages. Additionally, balancing the runtimes may promote a more even shelf temperature within the rectifier and switch circuit 630. Furthermore, during the process 900, the power controller 610 may rotate rectifiers 860 in a manner that runs rectifiers close to their maximum output current (or "capacity"), since typical rectifiers rectify more efficiently closer to their maximum output current. By running the rectifiers closer to capacity and thus more efficiently, the rectifier and switch circuit 630 will consume less power and may produce less heat, which in turn reduces the strain on cooling systems and reduces the power needed to operate cooling systems at the cell site 100.

Typical cell sites 100 utilize an "N+1" approach to guard against rectifier failures. In an "N+1" approach, the cell site 100 maintains online, at all times, the minimum number of rectifiers necessary to approximately accommodate the load demand plus at least one spare rectifier. Thus the online rectifiers may operate less efficiently since they run well below capacity due to the online spare. The typical approach may result in extra heat (due in part to lower efficiencies) and unnecessary wear of the rectifiers. In contrast, the process 900 may implement an "N+0" approach that permits a cell site 100 to maintain online only the minimum number of rectifiers necessary to approximately accommodate the load demand, without keeping any spares online. The battery circuit 660 permits a cell site 100 to operate without an online spare, since the battery circuit 660 can temporarily power the load in the event that an online rectifier fails during operation. For example, during short, peak periods of power demand (e.g., when the load power demand exceeds 105% of online rectifier capacity for less than five minutes), the battery circuit 660 may provide the needed excess power to the load in parallel to the online rectifiers.

To illustrate the cost savings that may be realized by running rectifiers more efficiently during the process 900, consider that if the rectification efficiency of a rectifier and switch circuit 630 increases from 80% efficiency to 90% efficiency, there should be at least a 10% power reduction realized, since less input current is required to produce the same output current. Additionally, due to the improved efficiencies, the heat generated by the rectifier and switch circuit 630 may also drop by 50%, which reduces the power needed to cool the cell site 100 via cooling systems such as air conditioning. Since as much as 28% of the power used at a typical cell site 100 goes towards cooling systems, the total power reduction realized may be much higher than simply a 10% reduction in input currents.

Alternatively, when temperatures in the cell site 100 or battery circuit 660 drop near the freezing point of the battery circuit 660 (or near other undesirably low temperatures), during the process 900, the power controller 610 may rotate additional rectifiers 860 online so that the online rectifiers run at a lower efficiency and thus produce more heat to keep the temperature of the battery circuit 660 or other components above a freezing point.

During the process 900, the power controller may also test the various rectifiers by determining, during periods when two or more rectifiers are online, whether the online rectifiers are demonstrating proper current balancing (e.g., that each is producing its proportionate share of the current drawn by a load). Finally, by handling redundant rectifiers, the process 900 may permit a cell site 100 to continue operating even if one or more rectifiers fail and may reduce the number of maintenance or site visits needed to maintain the cell site 600.

The process 900 of FIG. 9 begins at block 910, where the power controller 610 monitors the current and/or power demand of the rectifier and switch circuit 630 load (e.g., the communication interface 680, cooling systems (not shown), the power controller 610, and/or the battery circuit 660 loads), the temperature within and/or near the cell site (including the temperature of the battery circuit 660) and/or the state of the various rectifiers 860 (as determined by the status signals RECT_STAT). To monitor the actual, present load demand, the power controller 610 may monitor the output currents and/or power provided by the various online rectifiers 860 to the load and/or the output current/power provided by the battery circuit 660, if it is also powering the load in parallel to the rectifier and switch circuit 630.

Alternatively or additionally, in order to determine the load demand, the power controller 610 may monitor the input current and/or power drawn by the load (e.g., by evaluating the status signal COM_STAT and/or other status signals). Additionally or alternatively, the power controller 610 may estimate or predict the present load demand based on historical information, e.g., historical load demand information that correlates time, date, and/or environmental conditions (e.g., ambient temperature) to an estimated or predicted load demand.

To monitor the temperature within the cell site 100, the power controller 610 may evaluate the status signals BAT_STAT to determine the temperature at one or more locations in the battery circuit 660. Additionally or alternatively, the power controller 610 may utilize other status signals, including COM_STAT, RECT_STAT, other status or sensor signals not shown (e.g., status signals from a thermostat or cooling system), and/or weather data or forecasts received from a remote server to determine the temperature at one or more points in or near the cell site 100. Additionally or alternatively, the power controller 610 may evaluate various status or sensor signals to determine other environmental conditions that might affect the operation of the rectifier and switch circuit 630 (e.g., humidity, dew point).

At decision block 920, the power controller 610 determines whether the load demand, cell site 100 temperature, an applicable rotation policy, a rectifier status and/or other suitable factors necessitate a change or adjustment to the number of rectifiers 860 that are online and/or an adjustment to which particular rectifiers are online. If the power controller 610 determines that these factors necessitate a rectifier change, the process 900 proceeds to block 930, otherwise the process 900 repeats starting at block 910.

Table 3, below, includes some examples of possible conditions at decision block 920 that would necessitate a change or adjustment to the number of rectifiers 860 that are online and/or an adjustment to which particular rectifiers are online. These examples are described in greater detail herein.

TABLE 3

Example conditions that necessitate a change to the online rectifiers.

| | |
|---|---|
| 1 | A sustained increase in load demand indicates one or more additional or different rectifiers 860 should come online to provide additional power capacity. |
| 2 | A sustained decrease in load demand indicates one or more rectifiers 860 should come offline to improve efficiency. |
| 3 | A rectifier rotation is mandated by a prescribed or calculated rotation policy or schedule that aims to balance the runtimes of the various rectifiers and/or to facilitate rectifier testing. |
| 4 | The temperature in the battery circuit 660 necessitates a change in the number or type of rectifiers 860 that are operating online. |
| 5 | A failed or anomalous rectifier should be taken permanently or temporarily offline. |

As a first example, at block 920 the power controller 610 may determine whether a sustained increase in load demand indicates that it should bring one or more additional or different rectifiers 860 online to provide additional power capacity. In some implementations, the power controller 610 may determine whether the load demand has increased in a sustained fashion by evaluating whether the average load amperage during a time window increased by a particular delta amount since a prior time window or whether the average load amperage during the time window has exceeded a threshold value. Alternatively, or additionally, the power controller 610 may determine whether other metrics, such as the median, maximum, or minimum amperage observed over a time window or over a moving time window has increased by a particular delta amount or exceeded a threshold value.

The power controller 610 may set a difference or delta amount to a predetermined percentage of the maximum output current of an individual rectifier (e.g., 2 A, which is 5% of the capacity of a single 40 A rectifier) or the maximum total output current of all of the online rectifiers (e.g., 4 A, which is 5% of the capacity of two online 40 A rectifiers).

The power controller 610 may alternatively or additionally utilize a threshold value that is set to a predetermined percentage of the maximum total output current of all of the online rectifiers (e.g., 84 A, which is 105% of the 80 A capacity of two online 40 A rectifiers), to an amperage value that corresponds to an estimated efficiency of the rectifier and switch circuit 630 (e.g., to correspond to an estimated 90% efficiency), and/or to a value that reflects the ability or capacity of the battery circuit 660 to provide supplementary power above the maximum output of the online rectifiers.

Although the power controller 610 has been described as evaluating the average amperage over a particular time window, in other implementations, the power controller 610 may use other metrics, such as the median, maximum, or minimum amperage observed over a time window to determine whether an increase in load demand necessitates the addition or substitution of rectifiers.

The power controller 610 sets or receives the length of the time window used to calculate average load amperage (or other metrics) to a predetermined turn on delay value, which in some examples is chosen to be between approximately 5 and 30 minutes, and in one implementation is 25 minutes, although other delays are possible based on the specific configuration and needs at the cell site. The power controller 610 may additionally or alternatively adjust the turn on delay based on other suitable factors, such as the present or predicted load demands, the ability or capacity of the battery circuit 660 to provide power that supplements the output of the rectifier and switch circuit 630, the time of day or date, what input power source is being rectified (e.g., PRI_PWR or ALT_PWR), and/or other operational parameters or conditions.

If the power controller 610 determines that the load demand has increased in a sustained fashion, the power controller 610 may determine the number of additional rectifiers it should bring online in order to ensure that the rectifier and switch circuit 630 is supplying the load with sufficient operational power. The power controller 610 may determine the number of rectifiers to add based on the increase in load demand as determined by the power controller 610, the capacity and efficiency of the rectifiers, the time of day, date, battery circuit temperature, and/or any other suitable factors. As a first example, if the load demand increased by 2 A (5% of a 40 A rectifier capacity) and all the rectifiers 860 have equal capacity (40 A) and are operating at over 90%, the power controller 610 may determine that it should add one additional rectifier 860. Additionally or alternatively, the power controller 610 may determine whether it should substitute one or more rectifiers having a different capacity for one or more online rectifiers. As a second example, if a rectifier with a 40 A capacity is currently online, but the load has been drawing 45 A on a sustained basis, the power controller 610 may determine that it should take the 40 A rectifier offline and bring an available 50 A rectifier online.

One having skill in the art will appreciate that if all rectifiers are currently online, the power controller 610 cannot add an additional rectifier, despite a sustained increase in load demand.

As a second example, at block 920, the power controller 610 may determine whether a sustained decrease in load demand indicates that it should take one or more rectifiers offline in order to improve efficiency by running each online rectifier closer to its maximum output. In some implementations, the power controller 610 may determine whether load demand has decreased in a sustained fashion by evaluating whether the average load amperage during a time window decreased by a particular delta amount since a prior time window, or whether the average amperage during the time window has fallen below a threshold value. The power controller 610 may set a delta amount to a predetermined percentage of the maximum output current of an individual rectifier (e.g., 2 A, which is 5% of the capacity of a single 40 A rectifier) or the maximum total output current of all of the online rectifiers (e.g., 4 A, which is 5% of the capacity of two online 40 A rectifiers).

The power controller 610 may additionally or alternatively utilize a threshold value set to a predetermined percentage of a total output current or power of all of the online rectifiers (e.g., 95% of total capacity), to an amperage value that corresponds to an estimated efficiency of the rectifier and switch circuit 630 (e.g., a value that corresponds to an estimated 90% efficiency), and/or to a value that reflects the ability or capacity of the battery circuit 660 to provide supplementary power above the maximum output of the online rectifiers.

The power controller 610 may set the length of the time window used to calculate average load amperage (or other metrics) to a predetermined turn off delay value, which in some examples is chosen to be between 5 and 30 minutes. The power controller 610 may additionally or alternatively adjust the turn off delay based on other suitable factors, such as those described previously as being suitable for adjusting a turn on delay.

If the power controller 610 determines that the load demand has decreased in a sustained fashion, the power controller 610 may determine the number of currently online rectifiers that it should take offline. The power controller 610 may determine the number of rectifiers to take offline based on the decrease in load demand as determined by the power controller 610, the capacity of the rectifiers, the time of day, date, battery circuit temperature, and/or any other suitable factors. As a first example, if the load demand decreased by 2 A (e.g., 5% of a 40 A rectifier) and all the rectifiers 860 have equal capacity (40 A), the power controller 610 may determine that it should take one rectifier offline. Additionally or alternatively, the power controller 610 may determine whether it should substitute one or more rectifiers with a different capacity for one or more online rectifiers in order to balance rectifiers to load to increase efficiency (e.g., to 90%). For example, if a rectifier with a 50 A capacity is currently online, but the load has drawn 35 A on a sustained basis, the power controller 610 may determine that it should take the 50 A rectifier offline and bring a 40 A rectifier online.

One having skill in the art will appreciate that if only one rectifier is online and no smaller rectifiers are available, the power controller 610 will typically not take the single rectifier offline, despite a sustained decrease in load demand since it must continue to power the load in some fashion.

As a third example, at block 920, the power controller 610 may determine whether, regardless of whether the load demand has changed, it should rotate one or more online rectifiers offline in accordance with an applicable rotation policy or schedule that aims to balance or equalize the runtimes of the various rectifiers and/or to facilitate rectifier testing. For example, in accordance with an applicable rotation policy, the power controller 610 may rotate each rectifier offline after it has provided service online for one hour, four hours, a day, a week, etc. The online period used may depend on the number of rectifiers that are suitable for online service (e.g., the period may be 24 hours divided by the number of functional rectifiers).

Alternatively, or additionally, in accordance with an applicable rotation policy, the power controller 610 may evaluate information relating to the actual historical runtime of each rectifier 860 to determine whether a rectifier rotation is needed to help balance the runtimes of the various rectifiers. For example, the power controller 610 may evaluate a log reflecting when various rectifiers were online or their cumulative time online. For example, if a new rectifier was recently added to the rectifier and switch circuit 630, a rotation policy may dictate that it remain online for 3 hours at a stretch while older rectifiers remain online for only 1 hour until the cumulative runtime of the new rectifier approximately matches the cumulative runtime of the older rectifiers. As another example, if a new rectifier 860 was recently added to the rectifier and switch circuit 630, a rotation policy may dictate that for a certain number of rotation cycles (e.g., 1000 round-robin cycles as described herein), the new rectifier is the first rectifier turned on and the last one turned off and/or the new rectifier otherwise has a higher duty cycle than the older rectifiers.

As a fourth example, at block 920, the power controller 610 may determine that the temperature in the battery circuit 660 (or elsewhere in the cell site 100 or its environment) necessitates a change in the number or type of rectifiers 860 that are operating online. For example, during cold weather, if the temperature in the battery circuit 660 drops below a certain threshold (e.g., within 5 degrees of the freezing temperature of the batteries in the battery circuit 660), the power controller 610 may determine that it should bring one or more additional rectifiers 860 online to ensure that the online rectifiers run at a lower efficiency and thus produce more heat to keep the batteries from freezing. As another example, when a cold spell ends, if the temperature in the battery circuit 660 rises above a certain threshold (e.g., more than 5 degrees above the freezing temperature of the batteries in the battery circuit 660), the power controller 610 may determine that it should take one or more rectifiers offline (unless the load demand necessitates otherwise) to improve efficiency and obviate the need for air conditioning, heat exchangers, or similar cooling techniques.

As a fifth example, at block 920, the power controller 610 may determine that it should take a failed or anomalous rectifier permanently or temporarily offline. For example if the status signals RECT_STAT indicate that an anomalous rectifier 860 is producing an unbalanced or unequal current when compared to other rectifiers, the power controller 610 may determine that it should take the anomalous rectifier offline and replace it with a fully functional rectifier.

These examples of conditions that might necessitate a change to the online rectifiers are intended to be illustrative, not exhaustive. In some examples, the power controller 610 may determine, in accordance with an applicable rotation policy, that a combination of these example conditions also necessitates a change in the online rectifiers. For example, if load demand has dropped and the temperature has risen (and/or remained above a threshold), the power controller 610 may determine that it should reduce the number of online rectifiers to improve efficiency and avert the need for power-intensive air-conditioning or heat exchanging. As another example, if load demand has risen and an online rectifier is due for a scheduled rotation out of online duty, the power controller 610 may determine that rotating in a larger rectifier may facilitate both higher capacity and the scheduled rotation. In some other examples, the power controller 610 may determine that, in accordance with an applicable rotation policy, a combination of these example conditions has counteracting effects, which indicate that the power controller 610 should maintain the current arrangement of online rectifiers. For example, if the load demand has decreased in a sustained fashion, but the temperature in the battery circuit 660 has also dropped precipitously, the power controller 610 may determine that despite lower rectification efficiencies, it should keep all of the currently online rectifiers on duty so that the batteries will not freeze.

At block 930, the power controller 610 selects incoming rectifiers in accordance with an applicable rotation policy. The power controller 610 may select incoming rectifiers if it determines that it should add additional or different rectifiers due to a sustained change (e.g., increase) in load demand, an undesired decrease in temperature, an applicable rotation policy, a rectifier failure and/or similar events. The power controller 610 may select the incoming rectifiers on the basis of any suitable factors including: past, present, and/or predicted future load demands, the capacity of various online and offline rectifiers, the state or condition of various online and offline rectifiers (e.g., whether a rectifier has failed testing), the temperature and/or environmental conditions, the cumulative runtime of the various online and offline rectifiers, a predetermined or calculated rotation policy or schedule, the age of the rectifiers, etc.

In one implementation, in accordance with an applicable rotation policy, the power controller 610 selects the incoming rectifiers so that it rotates the rectifiers on a first-on/first-off, round-robin basis, so that during a single round-robin cycle, each rectifier is replaced by every other rectifier at least once. Such an approach approximately balances the runtimes of the various rectifiers. It also permits each rectifier to be tested or compared against each of the other rectifiers at least once during a handoff period. Such testing is described in greater detail herein at block 960. Of course, other rotation cycles for rectifiers may be used.

As an example, if the power controller 610 has six functional and equally sized rectifiers (e.g. rectifiers 860A-860F) at its disposal, in accordance with a round-robin rotation policy, during one day it may run rectifiers 860A-B during an early morning low-demand period, 860A-D during a mid-morning high-demand period, rectifiers 860C-D during a midday low-demand period, rectifiers 860C-F during an afternoon high-demand period, and rectifiers 860E-F during an evening low-demand period. In subsequent days, in accordance with the same rotation policy, the power controller 610 may incrementally shift the pairings and/or sequence utilized (e.g., first by one rectifier, then by two rectifiers, etc.) to ensure that each possible combination of incoming and outgoing rectifiers is utilized.

One having skill in the art will appreciate that many suitable round-robin selection techniques and algorithms may be utilized to accomplish the same goals of testing and comparing rectifiers and approximately balancing the runtimes.

Additionally or alternatively, in accordance with an applicable rotation policy, if the rectifier and switch circuit 630 has rectifiers 860 with different capacities, the power controller 610 may select incoming rectifiers in order to adjust the capacities of the online rectifiers and optionally, to implement a round-robin rotation policy. For example, the rectifier and switch circuit 630 may have two 25 A rectifiers, two 40 A rectifiers, and two 100 A rectifiers. In the example, the power controller 610 may determine that under the present load demands, a high rectification efficiency would be achieved by replacing a 100 A online rectifier with one 40 A rectifier and one 25 A rectifier. The power controller 610 may then determine which 40 A rectifier and 25 A rectifier are next scheduled for inward rotation under a round-robin policy. As another example, the power controller 610 may determine that it needs to raise the temperature of the battery circuit 660 by five degrees to avert freezing the batteries. The power controller 610 may then determine that given the present load demand (e.g., 50 A), it should replace two 40 A rectifiers with a 100 A rectifier in order to generate the heat necessary to raise the temperature accordingly.

In other implementations, the power controller 610 may select incoming rectifiers on a random or semi-random basis or another strategy that on average, distributes the runtime of the various rectifiers fairly uniformly and/or permits the various rectifiers to be tested against one another.

At block 940, the power controller 610 selects outgoing rectifiers in accordance with an applicable rotation policy. The power controller 610 may select outgoing rectifiers if it determines that it should take currently online rectifiers offline due to a sustained change (e.g., decrease) in load demand, an undesired increase in temperature, an applicable rotation policy, rectifier failure and/or similar events. The power controller 610 may select the outgoing rectifiers on the basis of any suitable factors including those discussed previously at block 930. The power controller 610 may select outgoing rectifiers in conjunction with selecting incoming rectifiers at block 930 using any of the methods described previously with respect to block 930. For example, the power controller 610 may select outgoing rectifiers to accomplish a rotation of the rectifiers on a first-on/first-off, round robin basis, to adjust the capacities of the online rectifiers, or on a random or semi-random basis.

At block 950, the power controller 610 brings the selected incoming rectifiers online. The power controller 610 may bring the selected incoming rectifiers online by commanding the incoming rectifiers (via a control signal such as RECT_CTL_STATE), to turn on, wake up from a sleep or standby mode, and/or begin rectifying an input power signal to a particular DC output voltage and/or particular output current and/or in accordance with other selected output parameters. For example, the power controller 610 may command the incoming rectifiers to raise their output voltage to the level of the online rectifiers and to activate current sharing alarms.

In some implementations, the power controller 610 may additionally or alternatively bring an incoming rectifier online by coupling the incoming rectifier to an input power source signal (e.g., PRI_PWR or ALT_PWR) using a control signal such as RECT_CTL_SRC. In still other implementations, the power controller 610 may additionally or alternatively bring an incoming rectifier online by coupling the incoming rectifier to a load using a control signal such as RECT_CTL_CPL. In order track the runtimes of the rectifiers 860, at block 950, the power controller 610 may also record and/or transmit (e.g., to a remote monitoring location) the approximate time that it brings an incoming rectifier online.

At block 960, the power controller 610 determines how much current each online rectifier is providing to the load.

The power controller 610 typically determines the current provided by each of the online rectifiers, including those that the power controller 610 selected at block 940 to come offline at block 970. The power controller 610 may make this determination by evaluating status signals such as RECT_STAT to determine the average amperage of each online rectifier during a particular time window. Additionally or alternatively, the power controller 610 may determine other current metrics (e.g., peak current, median current, etc.) during the time window by evaluating status signals. The power controller 610 may additionally store determined currents and or other metrics in memory for later retrieval and/or send these values to a remote monitoring location (e.g., using the OMC interface 720 to send the information via the status signal STATUS).

At block 960, the power controller 610 may additionally test the online rectifiers by comparing the currents provided by the various online rectifiers to determine if the currents are approximately balanced in an expected manner. The expected current balance may depend on the specifications and operational parameters of the online rectifiers. For example, if all of the online rectifiers are the same model and configured to operate in an identical fashion, the power controller 610 may expect approximately equal currents from all of the online rectifiers and may thus verify whether the actual determined currents are in fact roughly equal (e.g., all fall within a particular range, e.g., within 5% of each other). If the power controller 610 detects an anomalous current (e.g., a current that is lower or higher than an expected value by a specified percentage or value), it may take additional steps, such as determining whether any of the online rectifiers have previously experienced an anomalous current (e.g., by accessing previously stored values or querying a remote monitoring location), disabling or replacing the anomalous rectifier with another, storing the determined anomaly in memory, and/or reporting the anomaly to a remote monitoring location (e.g., using the OMC interface 720 to send the information via the status signal STATUS).

By detecting and optionally recording current anomalies and/or runtimes, the power controller 610, other system components, or a remote monitoring location may be able to determine whether a pattern of rectifier failure emerges (e.g., whether a particular lot of rectifiers fails at unusually high rates and/or fails after very little active use) and/or whether warranty remedies (e.g., refunds or replacement rectifiers) are available.

The power controller 610 sets the length of the time window used at block 960 to calculate average load amperage (or other metrics) to a predetermined or calculated testing time value, which in some examples is approximately 1 minute. The power controller 610 may additionally or alternatively adjust the testing time value based on other suitable factors, such as those described previously as being suitable for setting a turn on delay value, the specifications of the various rectifiers, and/or the operational settings of the various rectifiers. For example, the testing time value may be chosen so that all of the incoming rectifiers have an opportunity to reach a stable output after startup.

At block 970, the power controller 610 takes the selected outgoing rectifiers offline after the testing time has elapsed. The power controller 610 may also wait an additional amount of time beyond the testing time, e.g., to ensure that the incoming rectifiers are demonstrating expected currents that suggest they are functioning fully and/or to correct or replace any non-functional incoming rectifiers. The power controller 610 may take the selected outgoing rectifiers offline by commanding an outgoing rectifier to power off, to go into a sleep/standby mode, to stop rectifying an incoming power signal, to reduce its output voltage to a much lower voltage than online rectifiers (e.g., 5 V lower than online rectifiers), to lower the maximum output current, and/or to turn off rectifier alarms (e.g., current sharing alarms) that produce a notification that currents are unbalanced, using a control signal such as RECT_CTL_STATE. In some implementations, the power controller 610 may additionally or alternatively take a selected outgoing rectifier offline by decoupling the outgoing rectifier from an input power source signal (e.g., PRI_PWR or ALT_PWR) using a control signal such as RECT_CTL_SRC. In some implementations, the power controller 610 may additionally or alternatively take a selected outgoing rectifier offline by decoupling the outgoing rectifier from a load using a rectification control signal such as RECT_CTL LOAD. In order to permit tracking of the runtimes of the rectifiers, the power controller 610 may record and/or transmit (e.g., to a remote monitoring location) the approximate time that it takes an outgoing rectifier offline.

After block 970, the power controller 610 repeats the process 900 starting at block 910, by monitoring the load demand and temperature.

Although process 900 has been described as adjusting the configuration of online rectifiers "on the fly" or in real-time, one having skill in the art will appreciate that the power controller 610 may instead implement a predetermined or programmed rotation that anticipates forecasted or expected peak, average and low power demand periods. In such implementations, the battery circuit 660 may readily supplement the online rectifiers as needed if unexpected peak periods occur.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application and to pursue such additional claim forms, in either this application or in a continuing application.

I claim:

1. A non-transitory computer-readable medium carrying instructions that, when performed by a processor, perform a method for conserving power in a wireless communications system, the method comprising:
    detecting a reduced availability of a power source for the wireless communications system,
        wherein the wireless communications system forms part of a wireless telecommunications network;
    monitoring current drawn by the wireless communications system,
        wherein the wireless communications system has at least one online rectifier,
            wherein the at least one online rectifier rectifies an input source and provides an output voltage and current to the wireless communications system,
        wherein the wireless communications system has at least one offline rectifier,
            wherein the at least one offline rectifier does not rectify an input source and does not provide an output voltage and current to the wireless communications system;
    selecting, in accordance with a rotation policy or when detecting a reduced availability of the power source, at least one rectifier to bring online or at least one rectifier to take offline; and
    switching, in accordance with the rotation policy, at least one rectifier online or offline.

2. The non-transitory computer-readable medium of claim 1, wherein the rotation policy includes taking one rectifier offline by determining whether a sustained drawn current has decreased during a time window.

3. The non-transitory computer-readable medium of claim 1, wherein the rotation policy prescribes a first on/first off round-robin rectifier rotation.

4. The non-transitory computer-readable medium of claim 1, further comprising:
    determining whether the drawn current or the rotation policy necessitates a scheduled rectifier rotation that approximately balances runtimes of the rectifier.

5. The non-transitory computer-readable medium of claim 1, further comprising:
    comparing the currents of online rectifiers to test the online rectifiers for failures.

6. A power controller, comprising:
    a rectifier and switch circuit interface;
    an operation, management, and control (OMC) interface;
    a processor; and
    a memory storing instructions that, when executed by the processor, cause the power controller to:
        detect, by receiving a signal from the OMC interface, availability of a power source for a wireless communications system,
            wherein the wireless communications system forms part of a wireless telecommunications network;
            wherein the wireless communications system has at least one online rectifier,
            wherein the at least one online rectifier rectifies an input source and provides an output voltage and current to the wireless communications system,
            wherein the wireless communications system has at least one offline rectifier, and
            wherein the at least one offline rectifier does not rectify an input source and does not provide an output voltage and current to the wireless communications system;
        select, in accordance with a rotation policy or when detecting a reduced availability of the power source, at least one rectifier to bring online or at least one rectifier to take offline; and
        switch, in accordance with the rotation policy, the selected at least one rectifier from online to offline or offline to online,
            wherein switching further comprises sending a request to the rectifier and switch circuit interface, and
            wherein the request includes instructions to switch the selected at least one rectifier from online to offline or offline to online.

7. The power controller of claim 6, wherein the instructions when executed by the processor further cause the power controller to:

receive, from the OMC interface, status signals for multiple rectifiers; and switch, by sending a switch signal to the rectifier and switch circuit interface, at least one rectifier of the multiple rectifiers from online to offline based on the received status signals.

8. The power controller of claim 6, wherein the instructions when executed by the processor further cause the power controller to:

monitor, by receiving another signal from the OMC interface, current and power demand from multiple rectifiers associated with the wireless communications network during a first period of time;

store monitored current and power demand information; and based on the stored current and power demand information, switch one or more of the multiple rectifiers from online to offline during a second period of time.

9. The power controller of claim 6, wherein the instructions when executed by the processor further cause the power controller to:

determine whether at least two online rectifiers are demonstrating current balancing; and send an indication that the at least two online rectifiers are demonstrating current balancing to a remote system.

10. The power controller of claim 6, wherein the instructions when executed by the processor further cause the power controller to:

receive temperature information from sensors associated with the wireless communications system;

determine whether the temperature information indicates a temperature measurement for the wireless communications system has exceeded a threshold temperature; and in response to determining the temperature measurement has exceeded the threshold temperature, switch at least one rectifier to offline.

11. The power controller of claim 6, wherein the instructions when executed by the processor further cause the power controller to:

receive weather forecasting information; and in response to the received weather forecasting information, switch, in accordance with the rotation policy, at least one rectifier online or offline.

12. The power controller of claim 6, wherein the rotation policy is based on at least one of following:

a measured threshold value of voltage or amps for each of the multiple rectifiers;

a measured temperature threshold associated with batteries for the wireless communications system;

a rotation schedule;

runtime for each of the multiple rectifiers;

turn on or off delays for each of the multiple rectifiers; or any combination thereof.

13. A method, comprising:

monitoring an electrical load for each of multiple rectifiers configured to power a wireless communications system, wherein at least one of the multiple rectifiers is online, wherein each online rectifier is configured to rectify an input source and provide an output voltage and current to at least partially power the wireless communications system, wherein at least one of the multiple rectifiers is offline, wherein the at least one offline rectifier does not rectify an input source and does not provide an output voltage to the wireless communications system;

selecting, in accordance with a rotation policy or when detecting a reduced availability of the power source, at least one rectifier to bring online or at least one rectifier to take offline; and switching, in accordance with the rotation policy, at least one rectifier online or offline.

14. The method of claim 13, further comprising:

monitoring temperature near the multiple rectifiers; and switching, in accordance with the rotation policy, at least one rectifier online or offline based on a temperature change.

15. The method of claim 13, wherein the rotation policy is based on at least one the following:

a measured threshold value of voltage or amps for each of the multiple rectifiers;

a measured temperature threshold associated with batteries for the wireless communications system;

a rotation schedule;

runtime for each of the multiple rectifiers;

turn on or off delays for each of the multiple rectifiers; or any combination thereof.

16. The method of claim 13, further comprising:

receiving weather forecasting information; and in response to the received weather forecasting information, switching, in accordance with the rotation policy, at least one of the multiple rectifiers online or offline.

17. The method of claim 13, further comprising:

determining that one or more of the multiple rectifiers is receiving a sustained increase in electrical load demand; and in response to determining the sustained increase, switching at least one of the multiple rectifiers from offline to online.

18. The method of claim 13, further comprising:

receiving a notification that one of the multiple rectifiers has failed;

in response to receiving the notification, permanently switching the failed rectifier to offline; and sending an indication to an administrator of the wireless communications system, wherein the indication includes identifying information for the failed rectifier.

19. The method of claim 13, further comprising:

determining whether at least one of the multiple rectifiers is receiving a sustained decrease in electrical load demand; and in response to determining the at least one of the multiple rectifiers is receiving a sustained decrease in electrical load demand, switching the at least one of the multiple rectifiers to offline.

20. The method of claim 13, wherein the rotation policy includes a round-robin algorithm to rotate each of the multiple rectifiers from online to offline.

* * * * *